(12) United States Patent
Buchanan

(10) Patent No.: US 11,026,370 B1
(45) Date of Patent: Jun. 8, 2021

(54) HYDRAULIC BALE TRAILER

(71) Applicant: Vernon Roger Buchanan, Pawnee, OK (US)

(72) Inventor: Vernon Roger Buchanan, Pawnee, OK (US)

( * ) Notice: Subject to any disclaimer, the term of this patent is extended or adjusted under 35 U.S.C. 154(b) by 0 days.

(21) Appl. No.: 16/587,008

(22) Filed: Sep. 29, 2019

Related U.S. Application Data

(63) Continuation-in-part of application No. 15/398,918, filed on Jan. 5, 2017, now Pat. No. 10,427,579.

(51) Int. Cl.
| | |
|---|---|
| *A01D 90/00* | (2006.01) |
| *A01D 90/08* | (2006.01) |
| *A01D 90/10* | (2006.01) |
| *B60P 1/28* | (2006.01) |
| *B60P 1/16* | (2006.01) |

(52) U.S. Cl.
CPC .......... *A01D 90/083* (2013.01); *A01D 90/10* (2013.01); *B60P 1/165* (2013.01); *B60P 1/283* (2013.01)

(58) Field of Classification Search
CPC .... A01D 90/083; A01D 90/10; A01D 90/105; B60P 1/165; B60P 1/283; B60P 7/12; B60P 1/433; B60P 3/064
USPC ..................... 298/18; 414/24.5, 25, 111, 470; 56/473.5, 475, 476, 480
See application file for complete search history.

(56) References Cited

U.S. PATENT DOCUMENTS

| | | | |
|---|---|---|---|
| 3,159,287 A | 12/1964 | Stroup | |
| 3,799,612 A | 3/1974 | Norton et al. | |
| 3,877,595 A | 4/1975 | Edelman | |
| 3,922,036 A | 11/1975 | Kalsbeck et al. | |
| 4,079,996 A | 3/1978 | Vansickle | |
| 4,092,050 A | 5/1978 | Sobeck | |
| 4,138,159 A | 2/1979 | Hall | |
| 4,310,275 A * | 1/1982 | Hoelscher | A01D 85/005 414/111 |
| 5,123,800 A | 6/1992 | Druse, Sr. | |
| 5,730,572 A * | 3/1998 | Scheuren | A01D 90/083 414/24.5 |
| 5,882,085 A | 3/1999 | Pekarek | |
| 6,537,008 B1 | 3/2003 | Haring | |
| 10,427,579 B1 * | 10/2019 | Buchanan | B60P 1/162 |
| 2016/0106041 A1 * | 4/2016 | Thompson | A01D 90/083 |

FOREIGN PATENT DOCUMENTS

| | | |
|---|---|---|
| DE | 8714209 | 2/1988 |
| GB | 588668 | 5/1947 |

* cited by examiner

*Primary Examiner* — Stephen T Gordon
(74) *Attorney, Agent, or Firm* — Head, Johnson, Kachigian & Wilkinson, PC

(57) ABSTRACT

A hydraulic bale trailer comprising: a frame, where the frame is elongate and has a long axis; an axle caddy, where the frame is connected to the axle caddy such that the frame is capable of tilting on its long axis; a lock assembly connected to the axle caddy such that the lock assembly is capable of preventing the frame from tilting when the lock assembly is in an engaged position; and a hydraulic assembly with a first end and a second end, where the first end is connected to the frame and the second end is connected to the axle caddy and where the hydraulic assembly is capable of releasing the lock assembly from the engaged position to a disengaged position, allowing the frame to tilt.

12 Claims, 21 Drawing Sheets

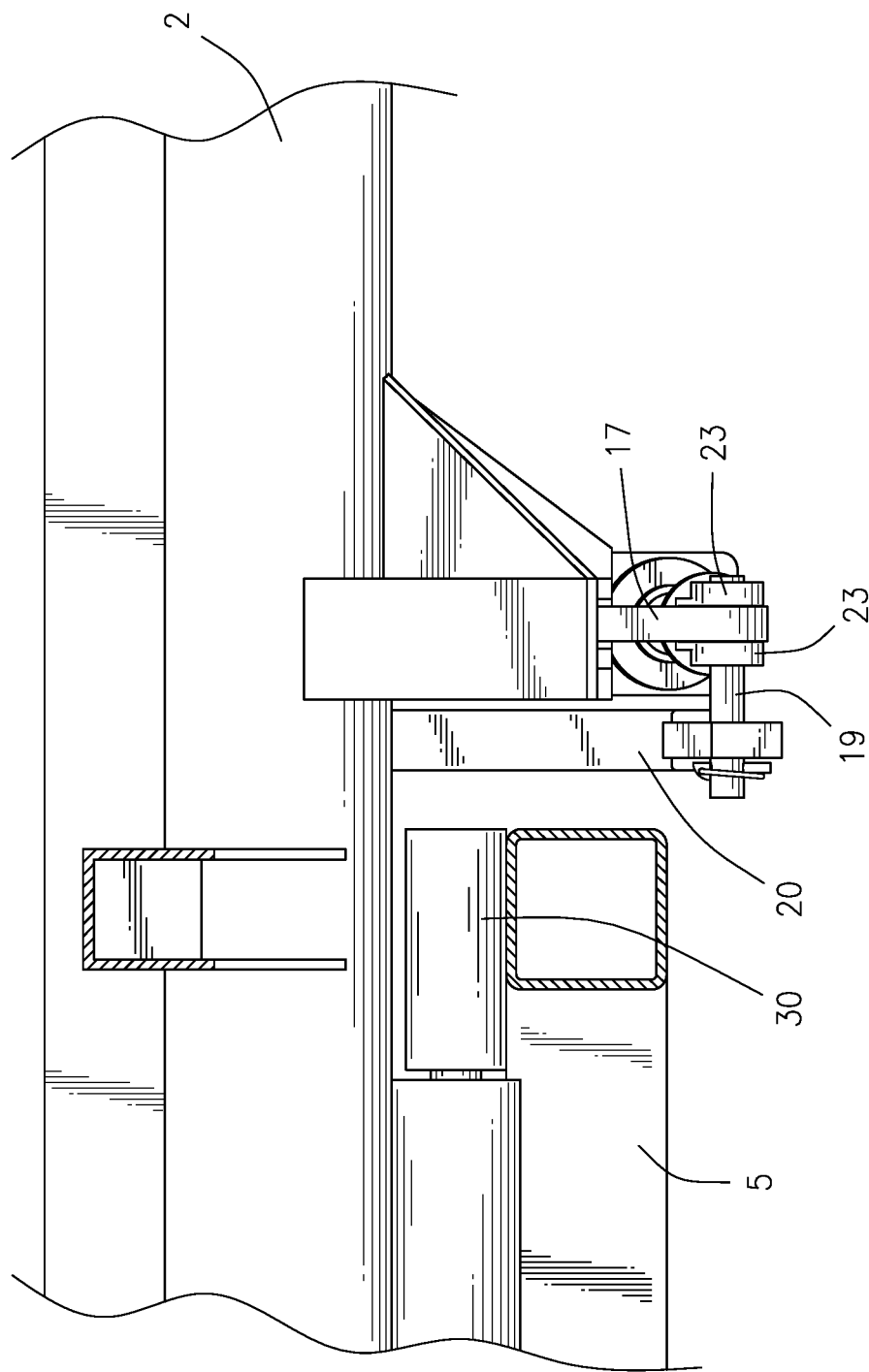

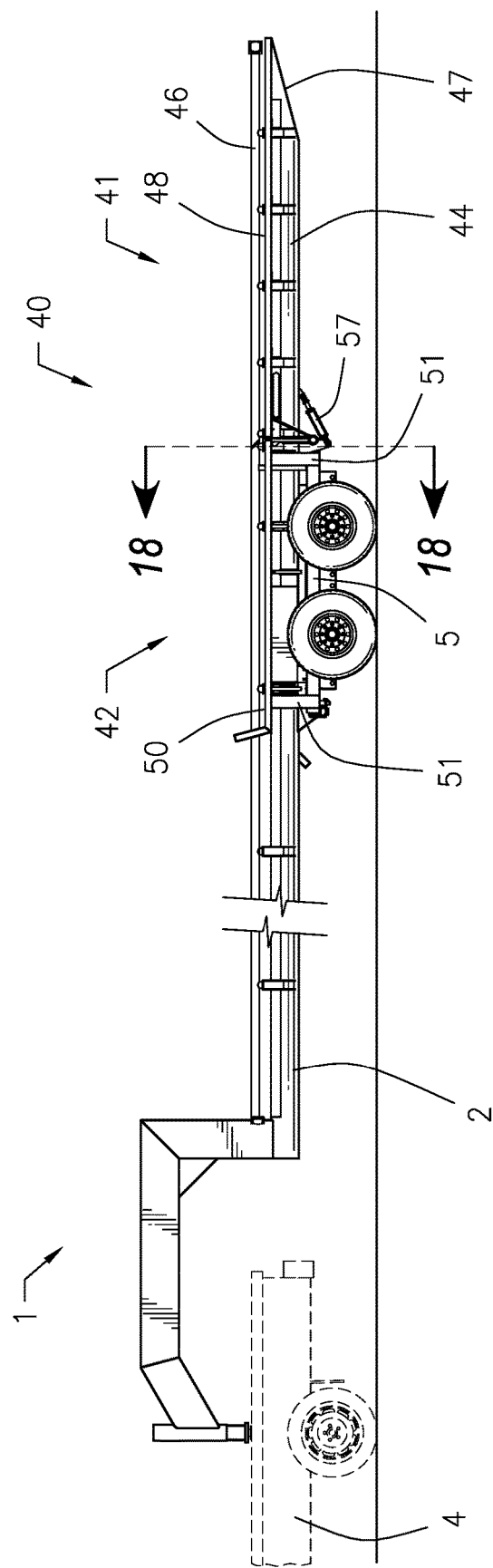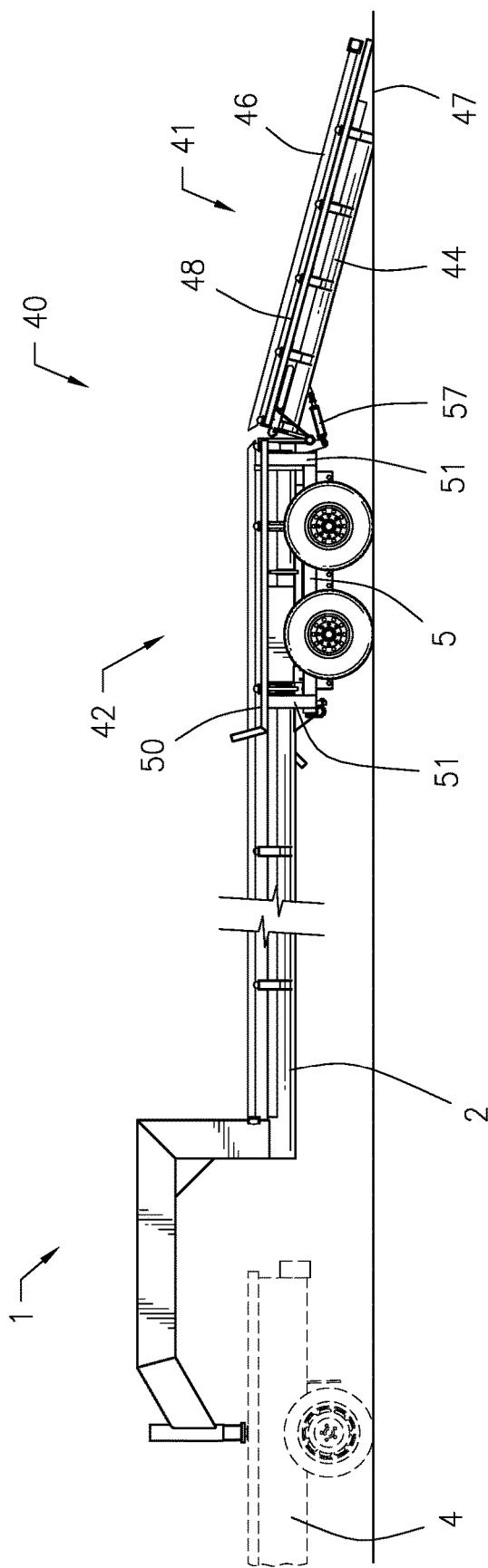

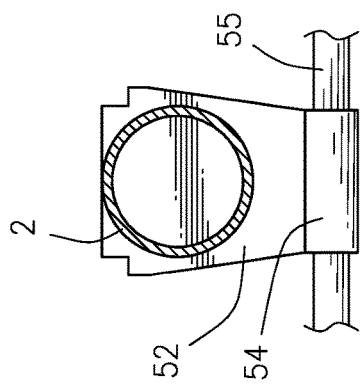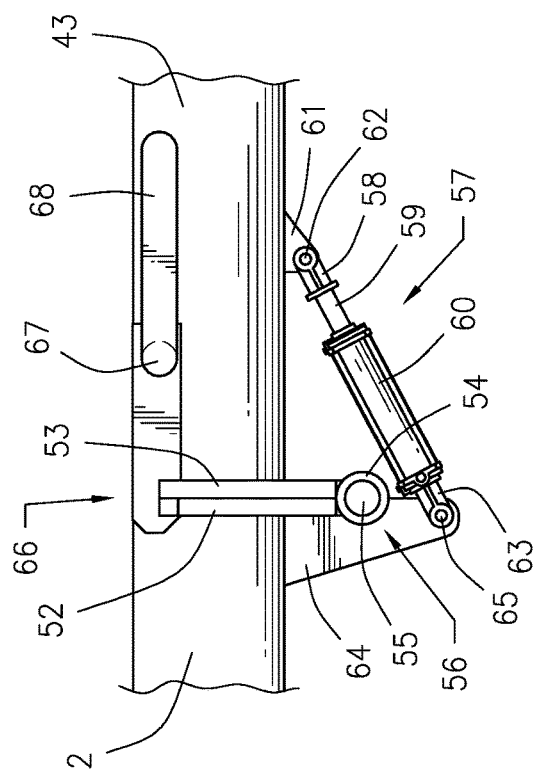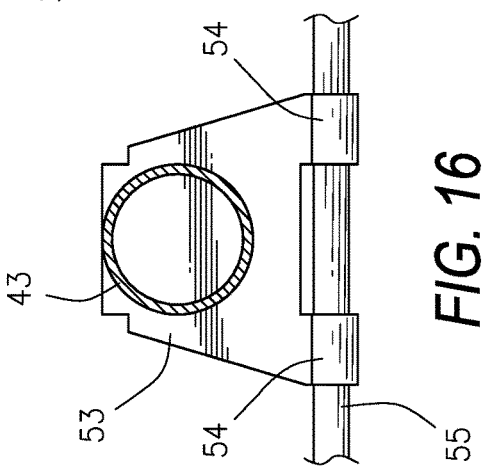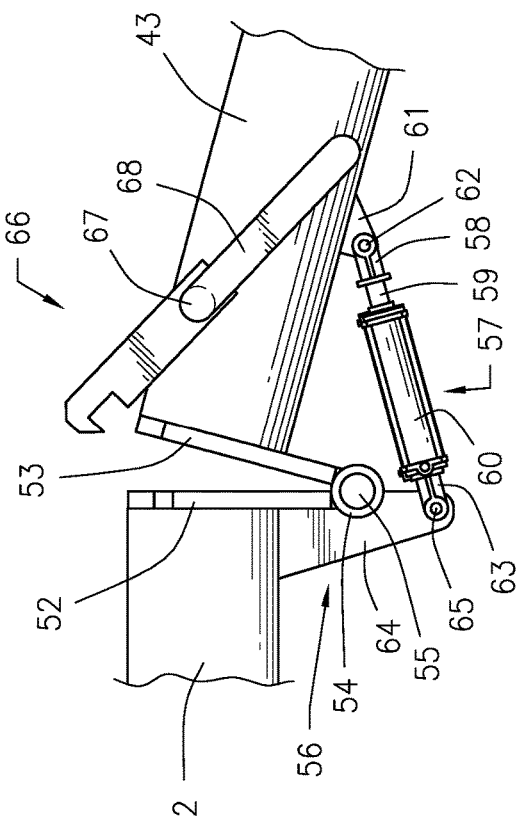

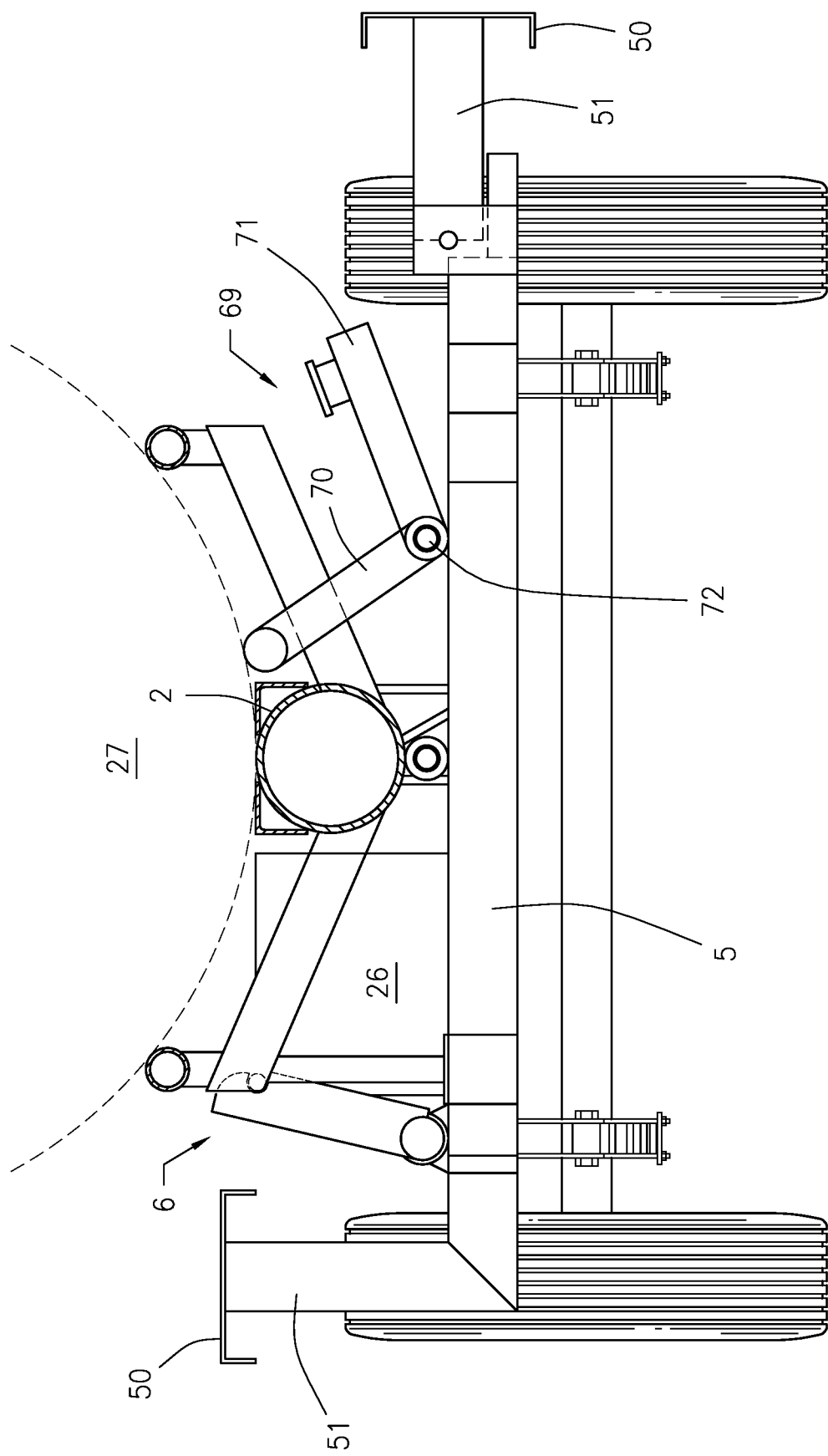

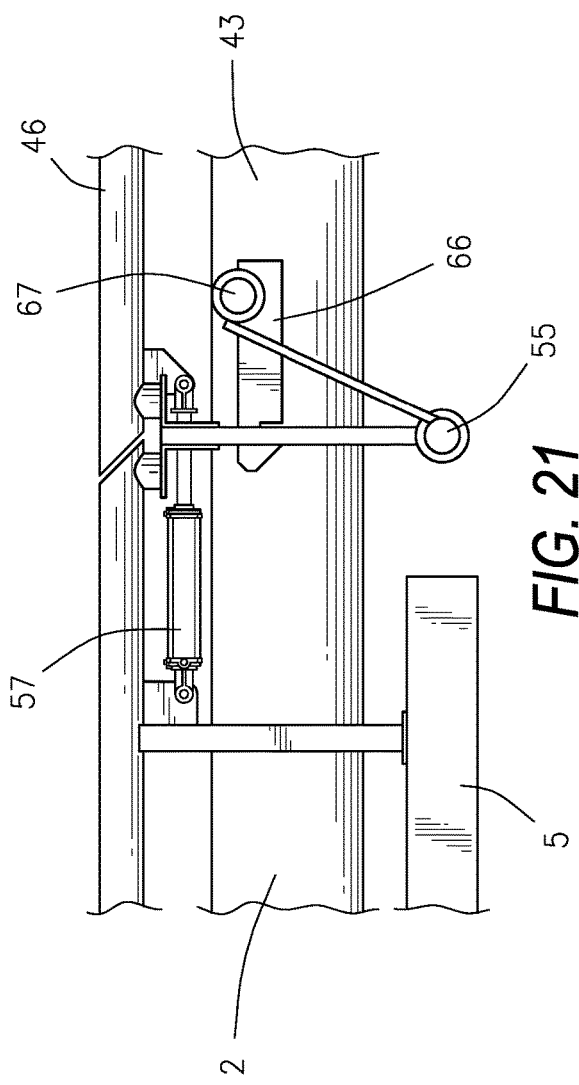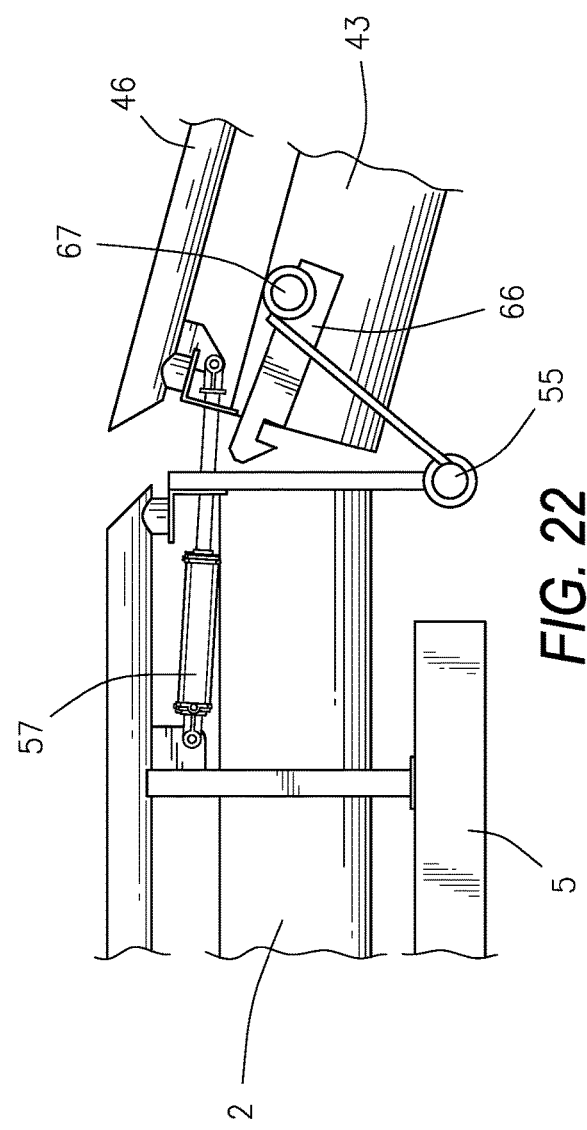

HYDRAULIC BALE TRAILER

CROSS REFERENCE

This application is a continuation-in-part of U.S. patent application Ser. No. 15/398,918 filed Jan. 5, 2017.

BACKGROUND OF THE INVENTION

Field of the Invention

This invention relates generally to a bale trailer, and more particularly, but not by way of limitation, to a bale trailer with a hydraulic cylinder for unlocking, dumping bales, returning the bale trailer upright, and relocking; a ramp and fenders for transporting a skid loader; and a bale kicker for assisting the removal of bales from the trailer.

Description of the Related Art

Single inline bale trailers are often used to haul large round bales with pickups or larger vehicles. The trailer pivots on the vehicle ball and trailer hitch. A second pivot point is at an axle caddy and frame. The pivot point is usually a pin and bushing. Round bales are loaded on the pipe rails of the trailer and pushed forward using tractors or skid loaders. Most bale trailers are manual dump using manpower to dump the bales. Some bale trailers are hydraulic, but have a rigid mount, only moving as fast as the hydraulics to dump and frequently failing to dump the bales.

Skid loaders are often used to move bales around and to load bales onto bale trailers. Thus, a second vehicle is often required to transport the skid loader separately from the bale trailer.

Bale trailers often rely primarily on gravity and momentum to dump the bales. This can be problematic if the ground is not level, causing the trailer to angle uphill toward the passenger side and consequently reducing the angle to which the frame tips, all of which may lead to the bales getting hung up and the bale trailer failing to dump the bales.

Based on the foregoing, it is desirable to provide a hydraulic bale trailer where the hydraulics work on the lock rather than directly on the frame.

It is further desirable for the mechanism to allow the momentum of the bales to dump rather than relying on the hydraulics.

It is further desirable for the hydraulics to assist in dumping the bales if needed.

It is further desirable for reversing the hydraulics to allow the locks to reengage.

It is further desirable to provide a hydraulic bale trailer with a ramp and fenders for loading and transporting a skid loader.

It is further desirable to incorporate hydraulics in the ramp system for easy lifting and lowering of the ramp.

It is further desirable to provide a bale kicker to assist in kicking bales out of the bale trailer.

SUMMARY OF THE INVENTION

In a first aspect, the invention relates to a bale trailer comprising a ramp system capable of loading and hauling a skid loader. The bale trailer may further comprise a frame, where the frame is elongate and has a long axis, and an axle caddy, where the frame is connected to the axle caddy such that the frame is capable of tilting on its long axis. The ramp system may comprising a ramp portion located rearward of the axle caddy, where the ramp portion comprises a ramp frame aligned with and pivotally attached to the frame such that: the frame and the ramp frame align along their long axes when the ramp frame is in an upright position; the ramp frame is capable of tilting on its long axis when the frame tilts on its long axis when the ramp frame is in the upright position; and the ramp frame is capable of pivoting to a downward-angled position such that the ramp frame forms a ramp from a surface upon which the bale trailer rests to the frame; and a fender portion located above the axle caddy.

The ramp portion may further comprise a pair of ramp elements attached to the ramp frame where each of the ramp elements is elongate and straight and has a flat top, and the fender portion may comprise a pair of fenders attached to the axle caddy where each of the fenders is elongate and straight and has a flat top and where the fenders align with the ramp elements such that a skid loader may be driven up the ramp elements when the ramp frame is in the downward-angled position and onto the fenders. The ramp elements may be attached to the ramp frame via a plurality of supports and the ramp elements may tilt along with the ramp frame when the ramp frame tilts. The fenders may be attached to the axle caddy via a plurality of supports and the fenders may not tilt when the frame tilts. The fender portion may further comprise a stop located at the front of at least one of the fenders. At least one fender may be pivotally attached to the axle caddy such that the fender is capable of being folded down during dumping of the bale trailer.

The ramp frame may comprise: a main pipe; a plurality of arms extending outward from the main pipe at an upward angle on both sides; and a pair of top rails supported by the arms, one top rail located on either side of the main pipe and running parallel thereto. The main pipe may have a back end that terminates in an angle such that the main pipe lays flat to the surface when the ramp frame is in the downward-angle position. The ramp portion may further comprise a pair of ramp elements attached to the ramp frame where: each of the ramp elements is elongate and straight and has a flat top; the ramp elements are located one on each side of the main pipe; and the ramp elements are located to the outside of and below the top rails.

The bale trailer may further comprise a hydraulic system such that the ramp portion is capable of pivoting between the downward-angled position and the upright position via the hydraulic system. The hydraulic system may be additionally capable of tilting the frame. The bale trailer may further comprise at least one lock assembly capable of maintaining the ramp portion in the upright position.

In a second aspect, the invention relates to a bale trailer comprising: a frame, where the frame is elongate and has a long axis and a top rail; an axle caddy, where the frame is connected to the axle caddy such that the frame is capable of tilting on its long axis; and a bale kicker. The bale kicker may comprise a first arm extending from a pivot point and a second arm extending from the pivot point at an angle to the first arm, where the bale kicker is pivotally mounted at the pivot point to the axle caddy to the side of the frame such that the bale kicker is capable of pivoting between a first position, with the first arm extending upward toward the frame such that the first arm is located under a bale on the frame when the frame is upright and in use and the second arm extends upward away from the frame, and a second position, such that when the frame is tilted, the top rail hits the second arm, forcing it downward and causing the first arm to rise. The angle between the first arm and the second arm may be a right angle.

In a second aspect, the invention relates to a bale kicker comprising a first arm extending from a pivot point and a second arm extending from the pivot point at an angle to the first arm, where the bale kicker is capable of being pivotally mounted at the pivot point to an axle caddy of a bale trailer to the side of a frame of the bale trailer such that the bale kicker is capable of pivoting between a first position, with the first arm extending upward toward the frame such that the first arm is located under a bale on the frame when the frame is upright and in use and the second arm extends upward away from the frame, and a second position, such that when the frame is tilted, a top rail of the frame hits the second arm, forcing it downward and causing the first arm to rise. The angle between the first arm and the second arm may be a right angle.

BRIEF DESCRIPTION OF THE DRAWINGS

FIG. 6 is a side view of the lock assembly and hydraulic assembly of the hydraulic bale trailer;

FIG. 7 is a side view of the hydraulic bale trailer with the ramp system of the present invention, with the ramp system in a horizontal locked position;

FIG. 8 is a side view of the hydraulic bale trailer with the ramp system in a downward-angled position;

FIG. 14 is a close-up side view of the frame, lower lock assembly, and lower hydraulic assembly of the ramp system in the horizontal locked position;

FIG. 15 is a close-up side view of the frame, lower lock assembly, and lower hydraulic assembly of the ramp system in the downward-angled position;

FIG. 16 is a close-up of the back plate and bushing;

FIG. 17 is a close-up of the front plate and bushing;

FIG. 19A is a back sectional view of the front portion of the ramp system, with the frame upright and bale in place and the passenger-side fender in the folded position, showing the bale kicker in a first position;

FIG. 21 is a close-up side view of the frame and an upper hydraulic assembly, as well as an alternate configuration of the lock assembly, of the ramp system in the horizontal locked position; and FIG. 22 is a close-up side view of the frame and upper hydraulic assembly, as well as the alternate configuration of the lock assembly, of the ramp system in the downward-angled position.

Figure 1:
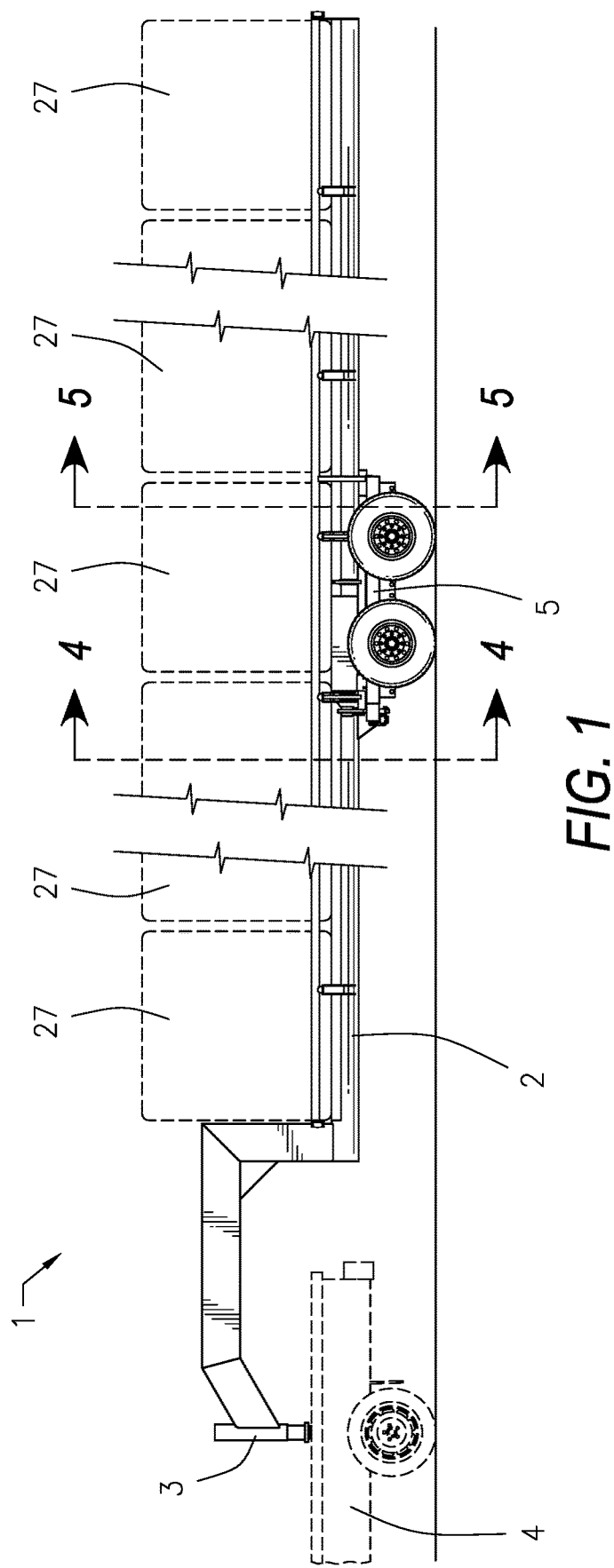
FIG. 1 is a side view of the hydraulic bale trailer of the present invention.
Figure 2:
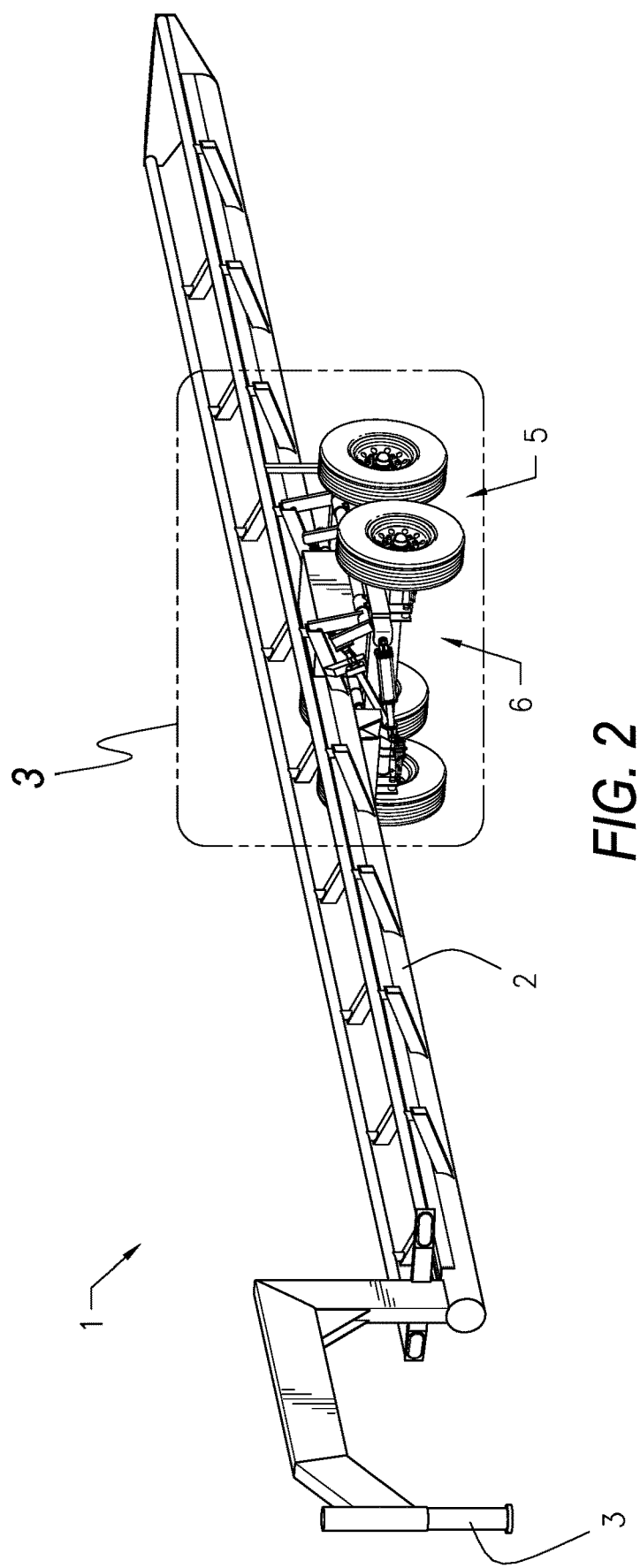
FIG. 2 is a perspective view of the hydraulic bale trailer.
Figure 3:
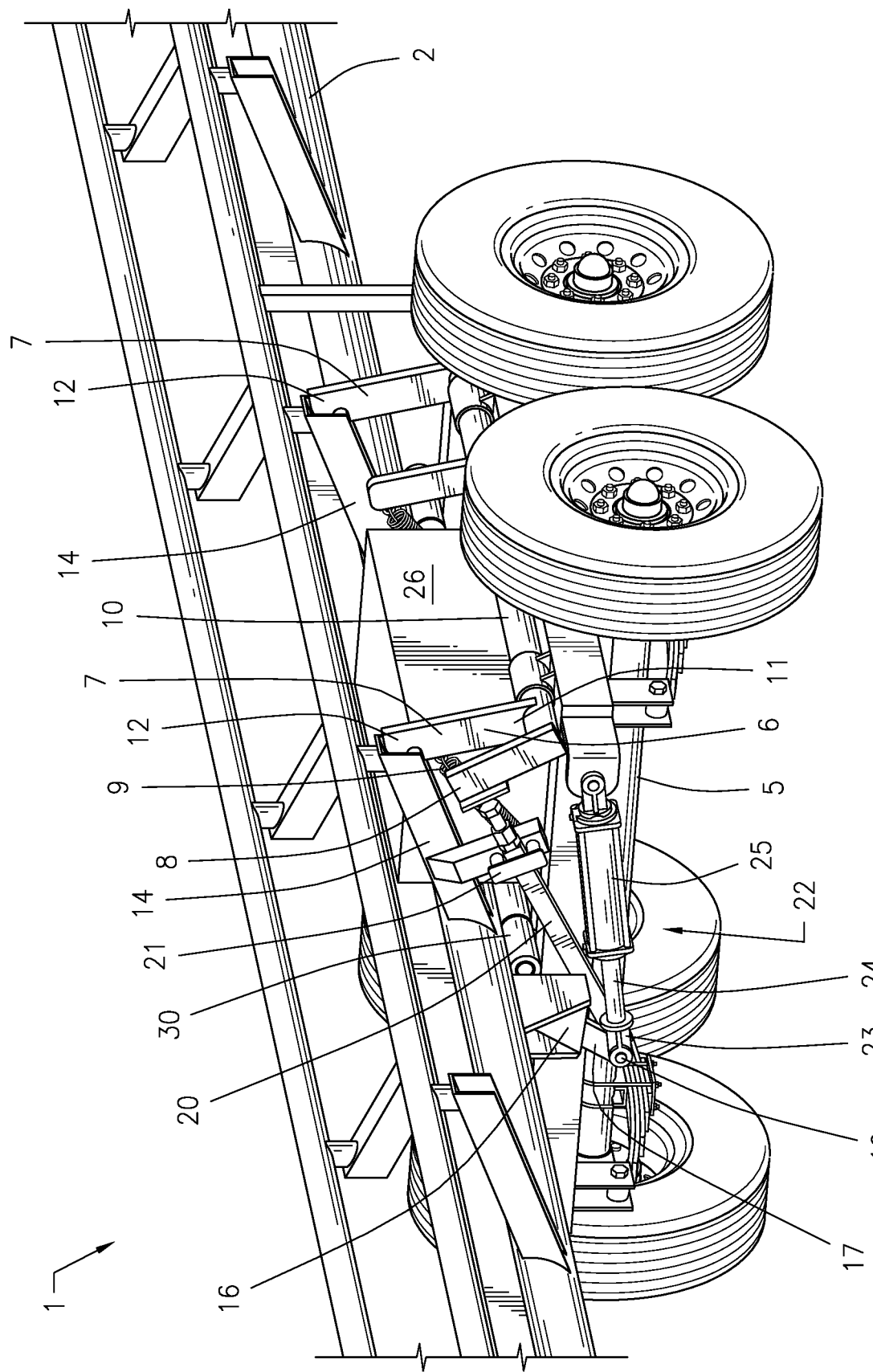
FIG. 3 is a close-up perspective view of the lock assembly and hydraulic assembly of the hydraulic bale trailer.
Figure 4A:
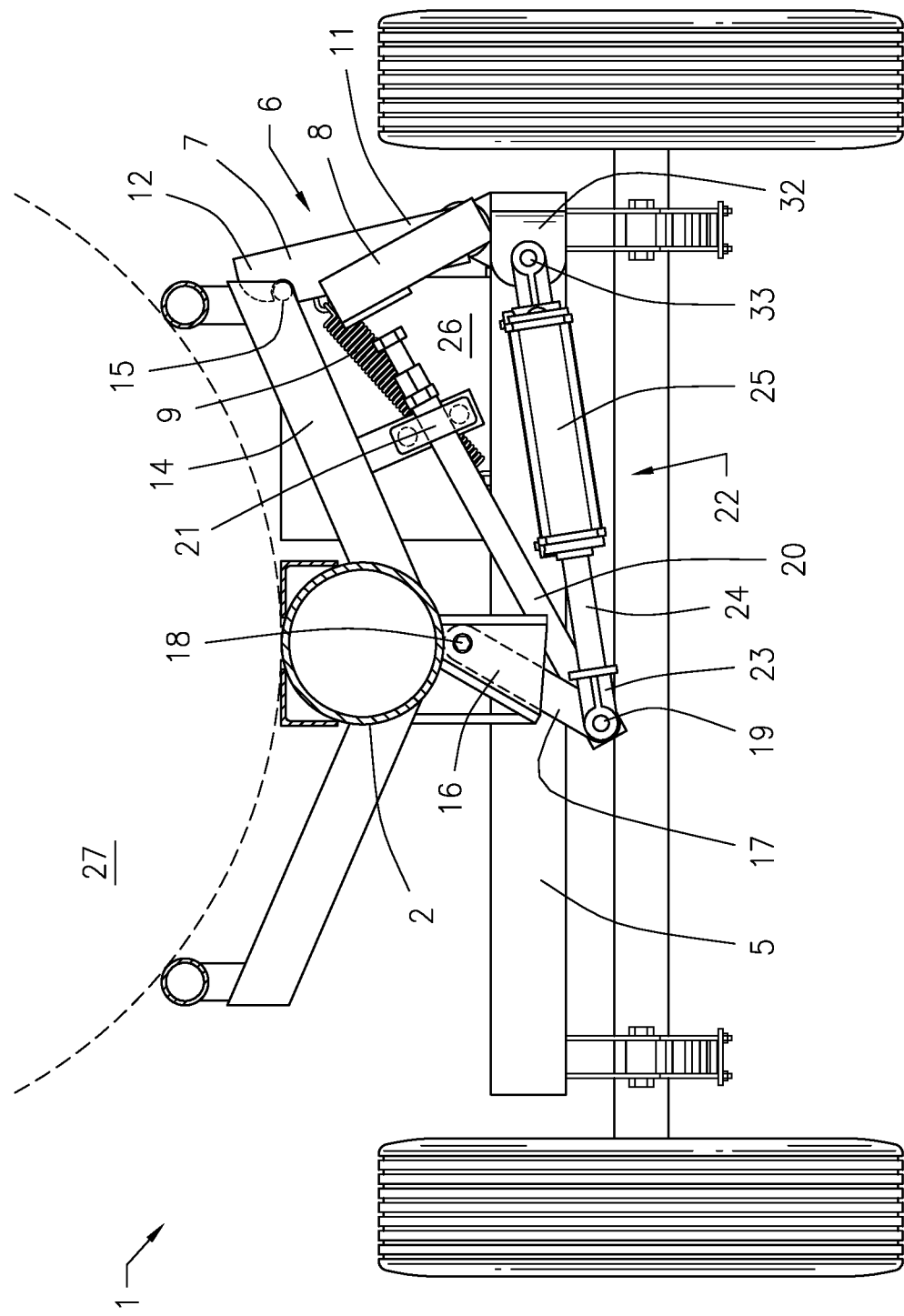
FIG. 4A is a front sectional view of the lock assembly and hydraulic assembly in a locked position with the frame upright and bale in place.
Figure 4B:
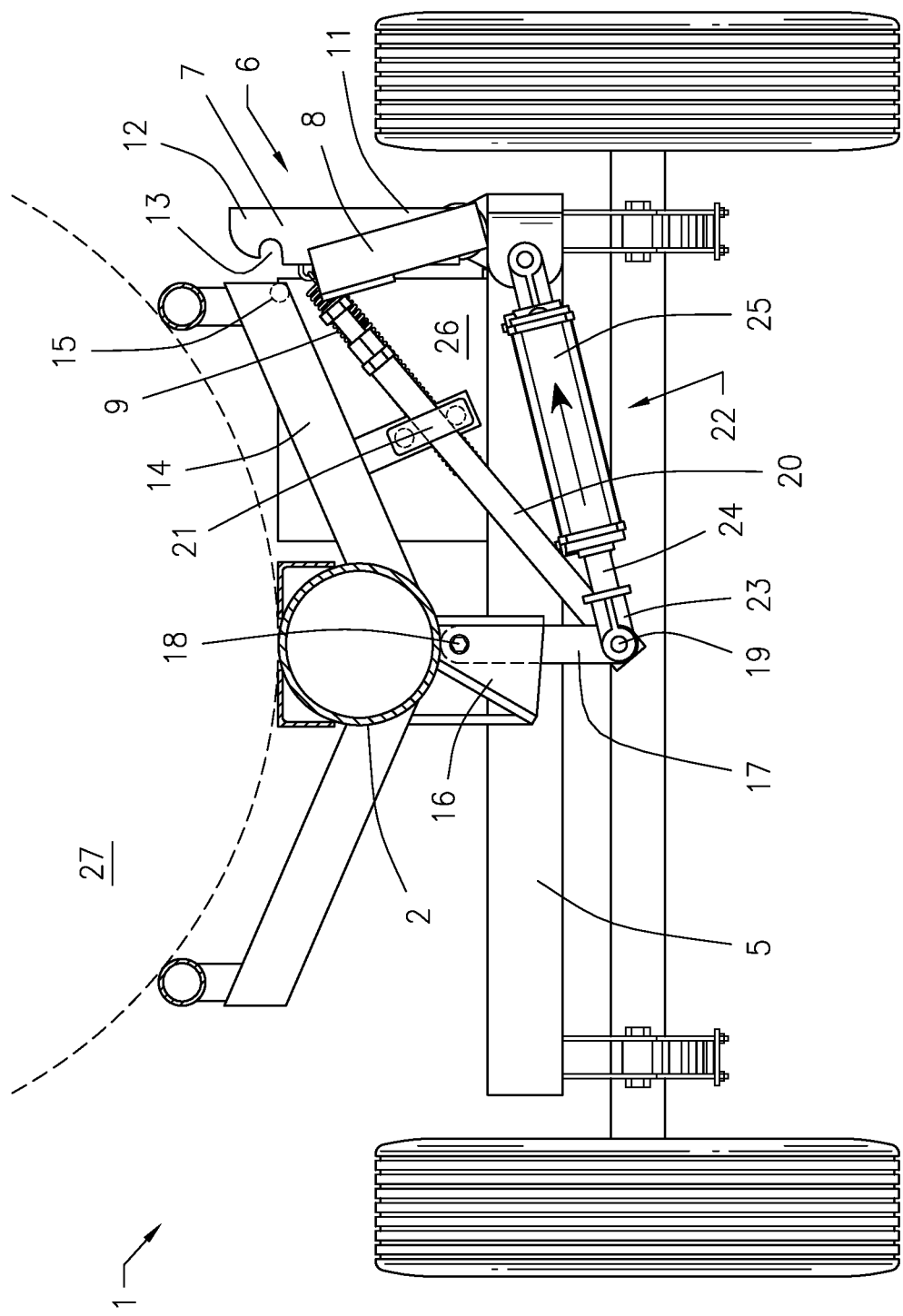
FIG. 4B is a front sectional view of the lock assembly and hydraulic assembly immediately after unlocking.
Figure 4C:
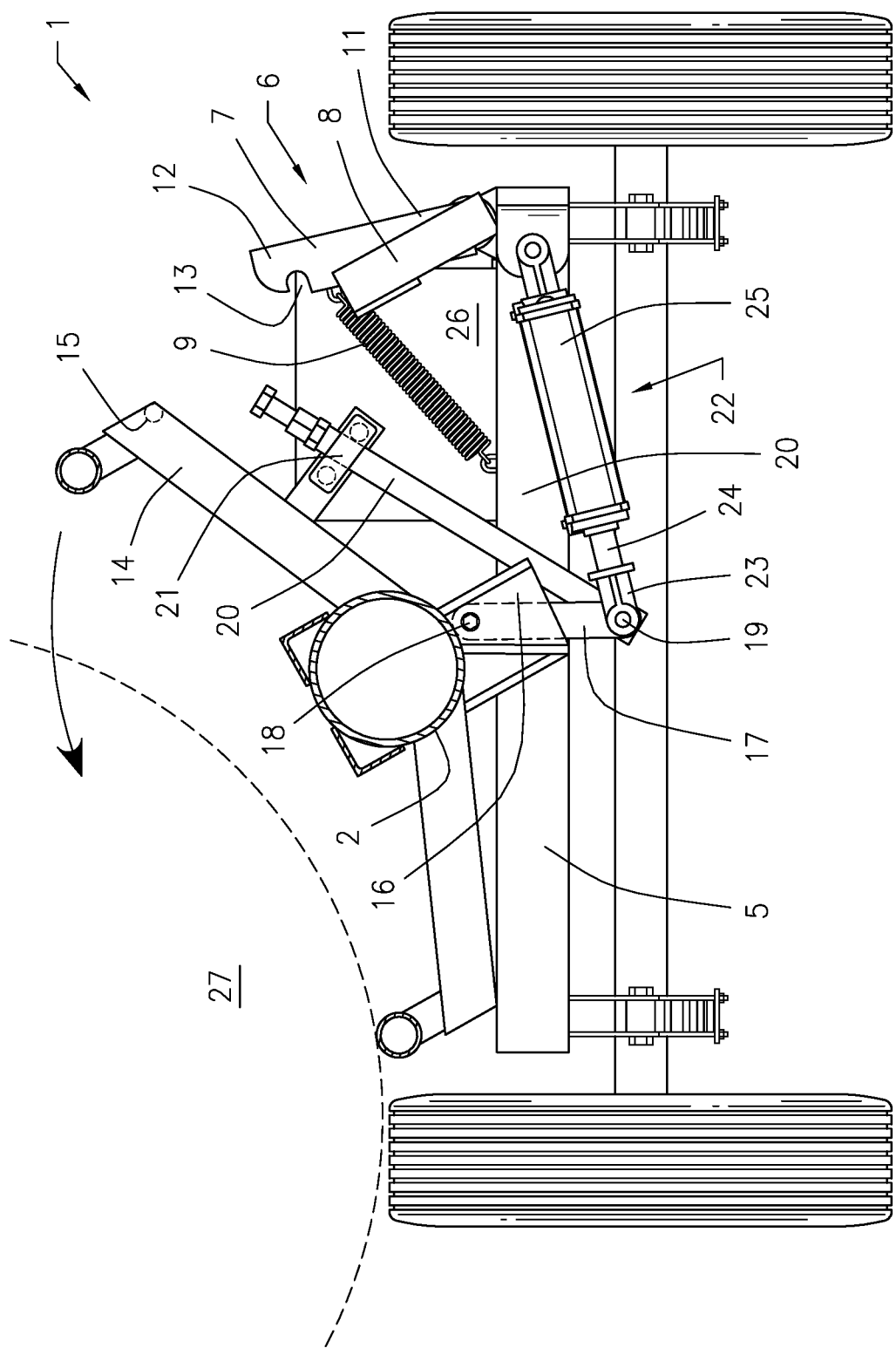
FIG. 4C is a front sectional view of the lock assembly and hydraulic assembly in the process of dumping the bale.
Figure 4D:
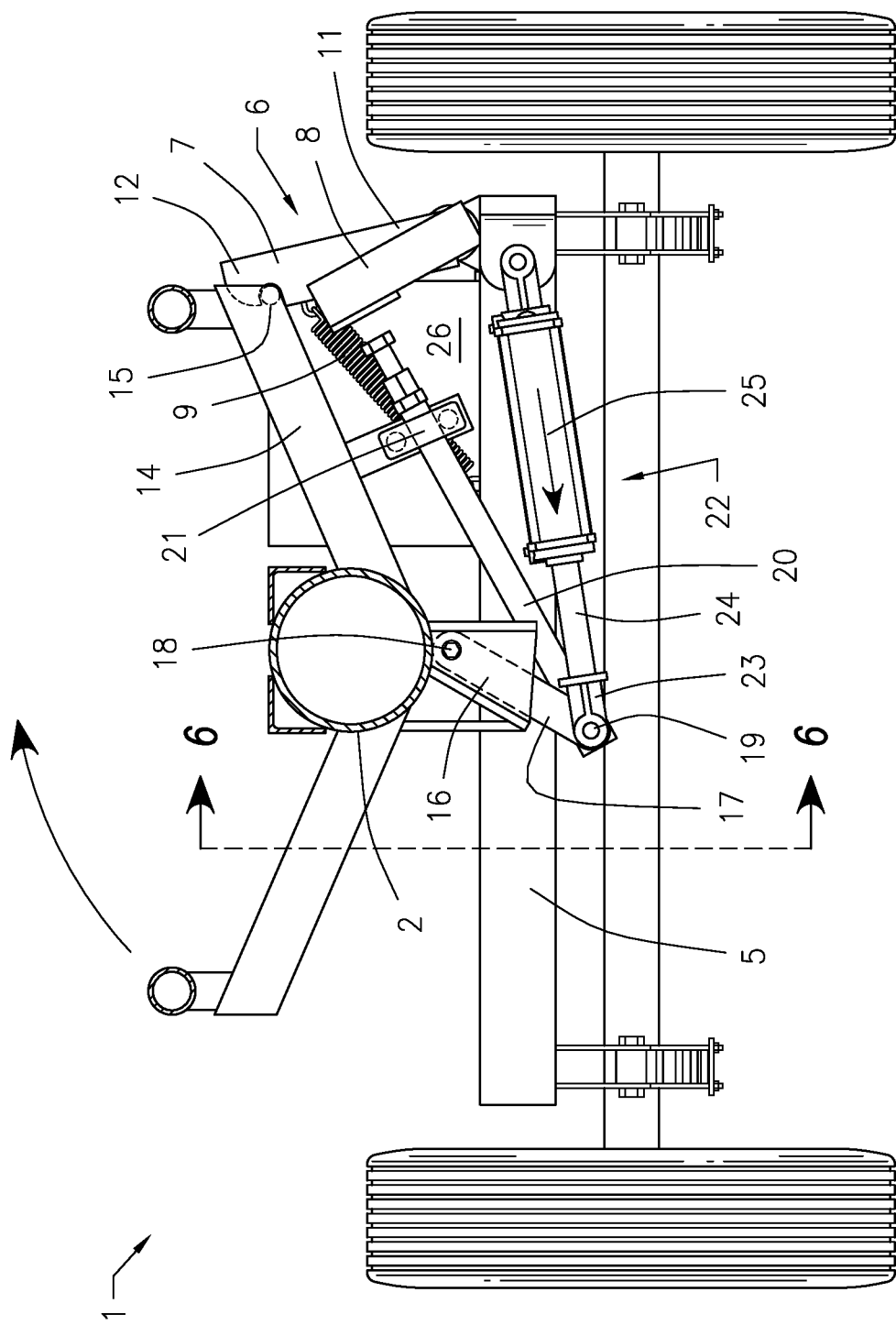
FIG. 4D is a front sectional view of the lock assembly and hydraulic assembly after dumping the bale and returning to the locked position.
Figure 5A:
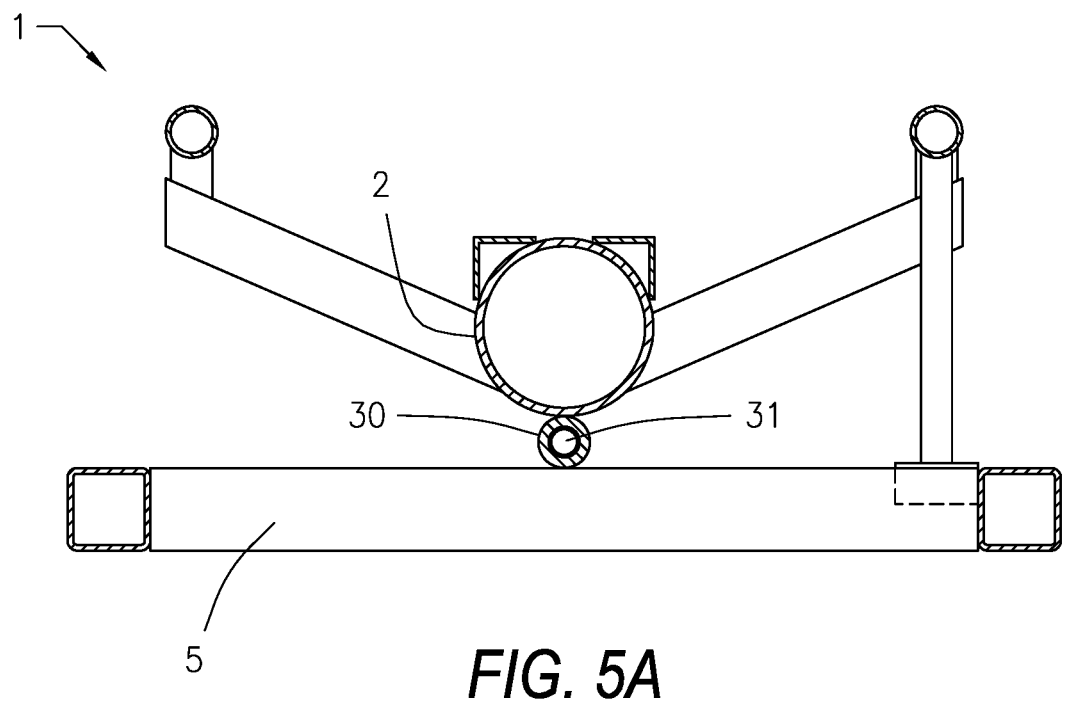
FIG. 5A is a front sectional view of the frame in an upright position, showing the pivot point.
Figure 5B:
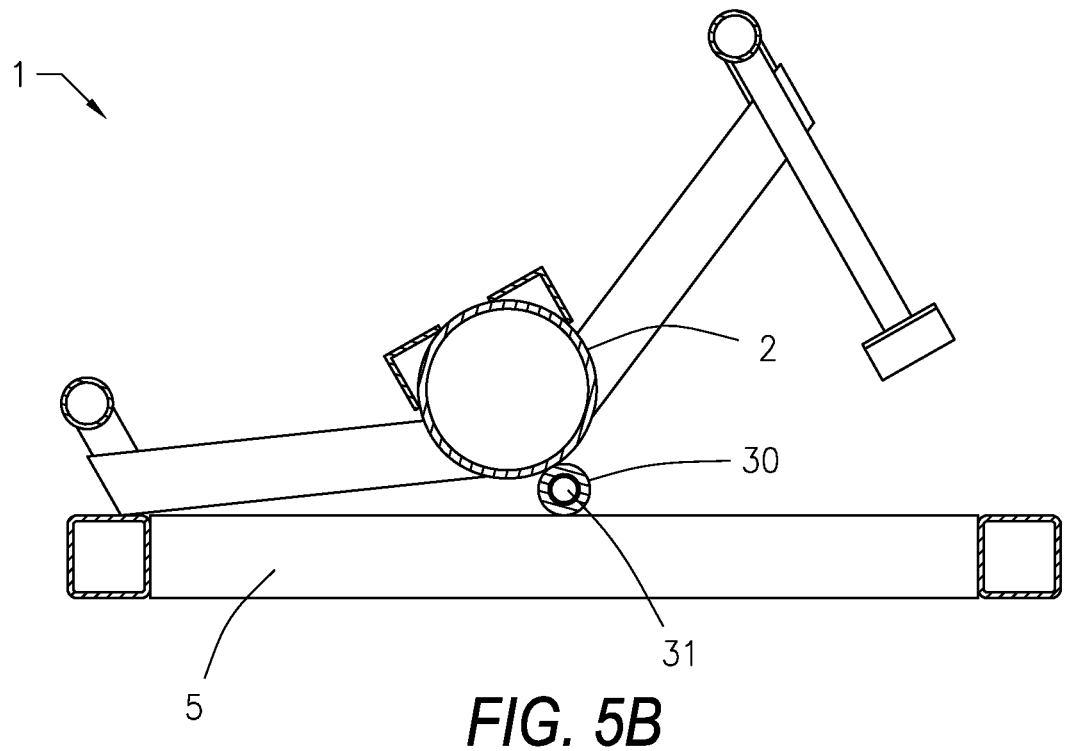
FIG. 5B is a front sectional view of the frame in a tilted positon, showing the pivot point.
Figure 9:
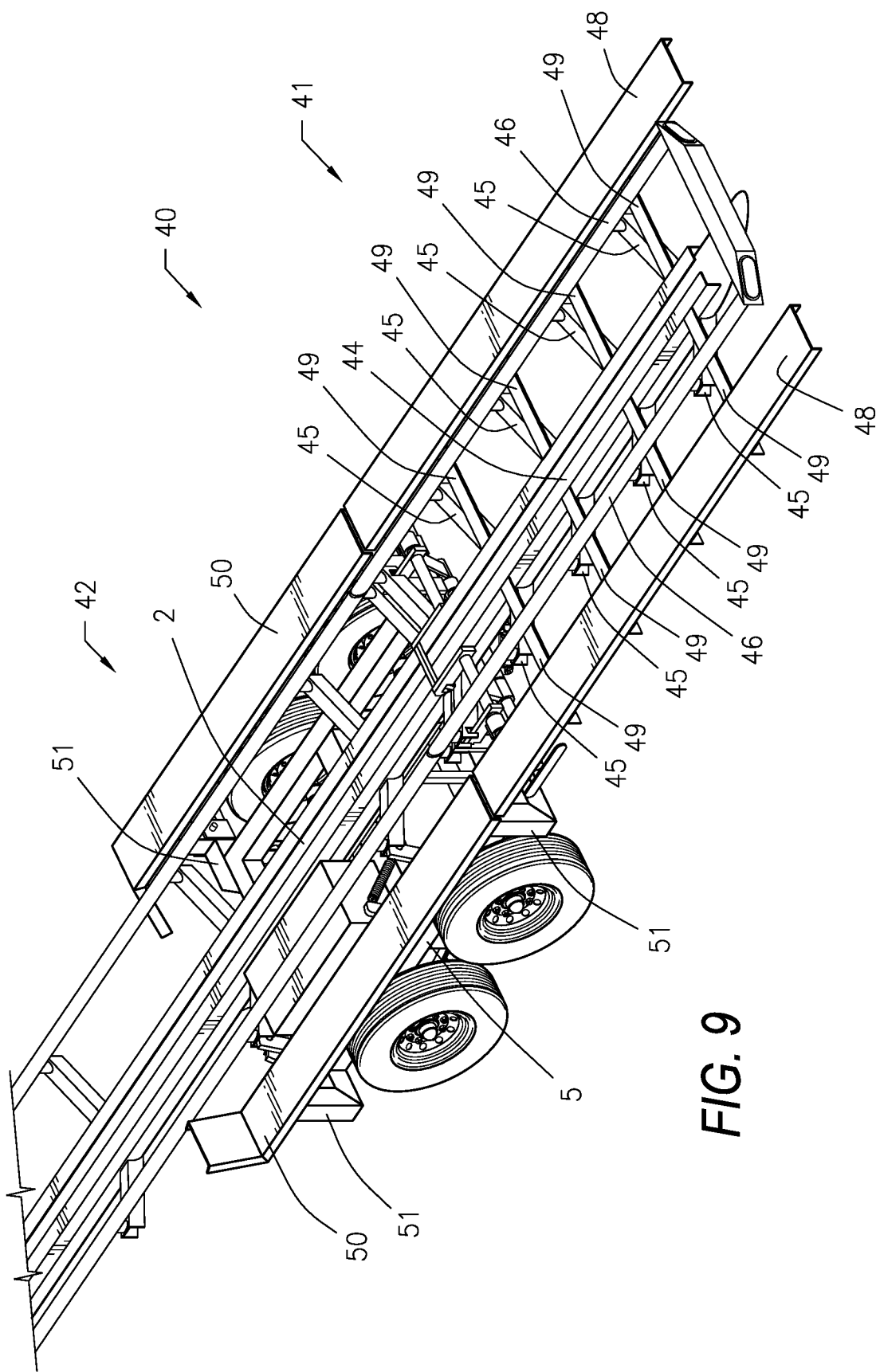
FIG. 9 is a perspective rear view of the ramp system in the horizontal locked position.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a bale trailer 1. The bale trailer 1 may have a frame 2 and may be connected via a ball and hitch connection 3 to a vehicle 4, such as a pickup or other large vehicle. The frame 2 may pivot at the ball and hitch connection 3 and at a second pivot point 30 with pivot pin 31 at the axle caddy 5. The frame 2 may be a pipe frame, and/or may be made of pipe, box tube, knobbing, or any other desired structure or material.

One or more lock assemblies 6 may be attached to the axle caddy 5. The lock assembly 6 may comprise one or more posts 7, a paddle 8, and one or more lock springs 9. The posts 7 may be pivotally attached to the axle caddy 5 such that they may pivot toward and away from the frame 2. The posts 7 may be mounted near the edge of the axle caddy 5, nearer the wheels than the center thereof. If there are multiple posts 7, all posts 7 may be connected to each other such that they pivot simultaneously. For example, the posts 7 may connect to the axle caddy 5 via a shared pivoting connector 10 such that all posts 7 pivot at the same time and to the same degree. Each post 7 may be generally elongate and may extend generally upward from the axle caddy 5 from a first end 11. Each post 7 may attach to the pivoting connector 10 at the first end 11. Each post 7 may have an opposed second end 12 and a notch 13 located at or near the opposed second end 12. The notch 13 may be located on the side of the post 7 nearer the frame 2, as opposed to the outward side of the post 7. Each post 7 may have a generally rectangular cross section, as shown, or may have any other desired shape.

The paddle 8 may be connected to the post 7 and may likewise pivot relative to the axle caddy 5, such that pushing the paddle 8 pivots the post 7. For example, the paddle 8 may connect to the pivoting connector 10, as shown, such that pivoting the paddle 8 causes all of the posts 7 to simultaneously pivot. The paddle 8 may have a flat face lying parallel to the long axis of the frame 2.

Each post 7 may be further connected to the axle caddy 5 via a lock spring 9. The lock spring 9 may connect at one end to the post 7 nearer the opposed second end 12 than the first end 11 and at its other end to the axle caddy 5 at a point nearer the center thereof than the post 7. The lock spring 9 may lie in a plane generally perpendicular to the long axis of the frame 2, such that pivoting the post 7 away from the frame 2 stretches the lock spring 9. The lock spring 9 may be generally rigid when in a non-stretched position, such that the lock spring 9 is capable of stopping the forward movement of the post 7 nearer the frame 2. Thus, the lock spring 9 maintains the post 7 in an engaged position when the lock spring 9 is in a non-stretched position, and returns the post 7 back to the engaged position when the post 7 is pivoted away from the frame 2 and the lock spring 9 is stretched. When in the engaged position, the post 7 may angle toward the frame 2, with the notch 13 facing somewhat downward.

An arm 14 may extend outward from the frame 2 toward the second end 12 of the post 7. The arm 14 may terminate in a horizontal cross piece 15, which may be sized and shaped to fit within the notch 13 in the second end 12 of the post 7. All elements may be positioned such that the horizontal cross piece 15 fits within the notch 13 when the frame 2 is upright and the post 7 is in the engaged position, or in other words when the trailer 1 is in a locked position. When the trailer 1 is in the locked position, the arrangement of parts may prevent the frame 2 from tipping, keeping the bales within the frame. Specifically, the post 7 may prevent the arm 14 from traveling upward, as it must do for the frame 2 to pivot. If the paddle 8 is pushed, the post 7 may pivot away from the frame 2, disengaging the notch 13 from the horizontal cross piece 15 and allowing the frame 2 to pivot.

A pendulum box 16 may extend downward from the underside of the frame 2. A pendulum 17 may be pivotally mounted therein, such as on a pendulum top mount bolt 18, as shown, or otherwise as desired. The pendulum 17 may pivot freely within the pendulum box 16 along a plane lying perpendicular to the long axis of the frame 2. A pin 19 may extend through the end of the pendulum 17, as shown. An unlock arm 20 may mount to the pin 19 such that the unlock arm 20 may pivot relative to the pendulum 17. The unlock arm 20 may likewise lie in a plane perpendicular to the long axis of the frame 2. A bracket 21 may extend downward from the arm 14, and the unlock arm 20 may extend through the bracket 21 such that the bracket 21 holds the unlock arm 20 in an upward-angled position but allows axial movement of the unlock arm 20 through the bracket 21. The unlock arm 20 may be aligned with the paddle 8 such that the end of the unlock arm 20 is capable of pressing the paddle 8.

A hydraulic cylinder 22 may be pivotally mounted on one end on the pin 19 and on its other end to the axle caddy 5. The hydraulic cylinder 22 may comprise a hydraulic mount 23, a piston rod 24, a housing 25, and a hydraulic pump 26. The hydraulic mount 23 may straddle the end of the pendulum 17, with the pin 19 passing therethrough to pivotally attach the pendulum 17 and the hydraulic mount 23. The housing 25 may be mounted to the axle caddy 5 via a cylinder mount 32 and cylinder pin 33, and the piston rod 24 may be attached at one end to the hydraulic mount 23 with its other end housed within the housing 25. The hydraulic pump 26 may be mounted elsewhere on the axle caddy 5, but may be in fluid communication with the housing 25 such that the piston rod 24 may reciprocate therein. The hydraulic pump 26 may be run to the truck or other vehicle 4. The hydraulic cylinder 22 alternately may be an electronic actuator.

During use, the bale trailer 1 may begin in the locked position, with the frame 2 in the upright position with bales 27 held therein. The lock assembly 6 may be engaged, with the posts 7 angling toward the frame 2 and the horizontal cross pieces 15 of the arms 14 held within the notches 13 in the posts 7, preventing the frame 2 from tipping. The piston rod 24 may be extended, holding back the pendulum 17, and consequently the unlock arm 20, such that the end of the unlock arm 20 is not in contact with the paddle 8. When the hydraulic cylinder 22 is engaged, the piston rod 24 may be retracted into the housing 25. As the piston rod 24 retracts, it may pull the hydraulic mount 23 toward the housing 25, causing the pin 19, and consequently the pendulum 17 and the end of the unlock arm 20 mounted thereon, to also move. This movement may cause the unlock arm 20 to move toward the paddle 8, eventually pushing against the paddle 8. Pushing the paddle 8 may cause the posts 7 to pivot away from the frame 2, which may cause the lock assembly 6 to disengage, freeing the horizontal cross pieces 15 from the notches 13 and placing the bale trailer in the unlocked position. With the arm 14 no longer held in place, the frame 2 may be free to tip sideways, allowing the bales 27 to fall out of the frame 2. This tipping may occur with no further prompting due to the weight of the bales 27, particularly if the center of gravity of the frame 2 is off center. Once the tipping begins, the momentum of the bales 27 may accelerate the tipping and allow the bales 27 to be kicked out. The play in the mechanism may allow such movement, as opposed to a system wherein hydraulics directly act on a frame. In such systems, the hydraulics reduce the momentum and must necessarily fully extend to offload bales therefrom. The present invention, however, allows the bales 27 to offload sooner in the hydraulic cycle without the need to fully retract the piston rod 24. Specifically, the distance between the sides of the pendulum box 16 may allow the frame 2 to move freely when dumping, without hitting the pendulum 17.

If the frame 2 does not tip immediately after the lock assembly 6 is disengaged, such as if the bale trailer 1 is on uneven ground and the tipping must occur uphill or the center of gravity of the frame 2 is otherwise not in a direction that allows immediate tipping, the hydraulic cylinder 22 may continue retracting, eventually pushing the pendulum 17 against the side of the pendulum box 16, causing the frame 2 to pivot and the bales 27 to tip out. Once the bales 27 have fallen out of the frame 2, the motion of the hydraulic cylinder 6 may be reversed, with the piston rod 24 again extending and pulling the unlock arm 20 away from the paddle 8. The lock springs 9 may then encourage the posts 7 to return to the engaged position. The pendulum 17 may push against the opposite side of the pendulum box 16, causing the frame 2 to return to its upright position, allowing the notches 13 in the posts 7 to again engage the horizontal cross pieces 15. The bale trailer 1 may thus return to the locked position.

The bale trailer 1 may be manufactured with any or all elements described herein included. Alternately, the lock assembly 6 and/or the hydraulic assembly described herein may be retrofitted to an existing manual bale trailer.

The bale trailer 1 may have a ramp system 40 for loading and hauling a skid loader or similar equipment. The ramp system 40 may be used in conjunction with the hydraulic system described above or may be used with a manual dump bale trailer, a rigid mount hydraulic bale trailer, or any other bale trailer, as desired. The ramp system 40 may comprise two portions: a ramp portion 41 and a fender portion 42. The ramp system 40 is shown with the ramp portion 41 in horizontal locked position in FIG. 7 and with the ramp portion 41 in a downward-angled position in FIG. 8. When the ramp portion 41 is in the downward-angled position, a skid loader or similar equipment may be driven up the ramp portion 41 and onto the fender portion 42. The ramp portion 41 can then be raised to the horizontal position and locked in place for transport. When the desired destination is reached, the user may lower the ramp portion 41 to the downward-angled position and drive the skid loader or similar equipment off the bale trailer 1 for use. The user may use the skid loader or similar equipment to place bales 27 on the bale trailer 1, remove bales 27 from the bale trailer 1, or otherwise move bales 27 around. The ramp portion 41 may be raised to the horizontal position and locked in place to use the fender portion 42 and the ramp portion 41 to carry bales when transporting the skid loader or similar equipment is not desired. In other words, the bale trailer 1 may be fully loaded with bales 27, including in the ramp portion 41 and the fender portion 42. Alternately, only the portion of the bale trailer 1 excluding the ramp system 40 may be loaded with bales 27, allowing a few bales 27 to be transported along with the skid loader or similar equipment.

Figure 11:
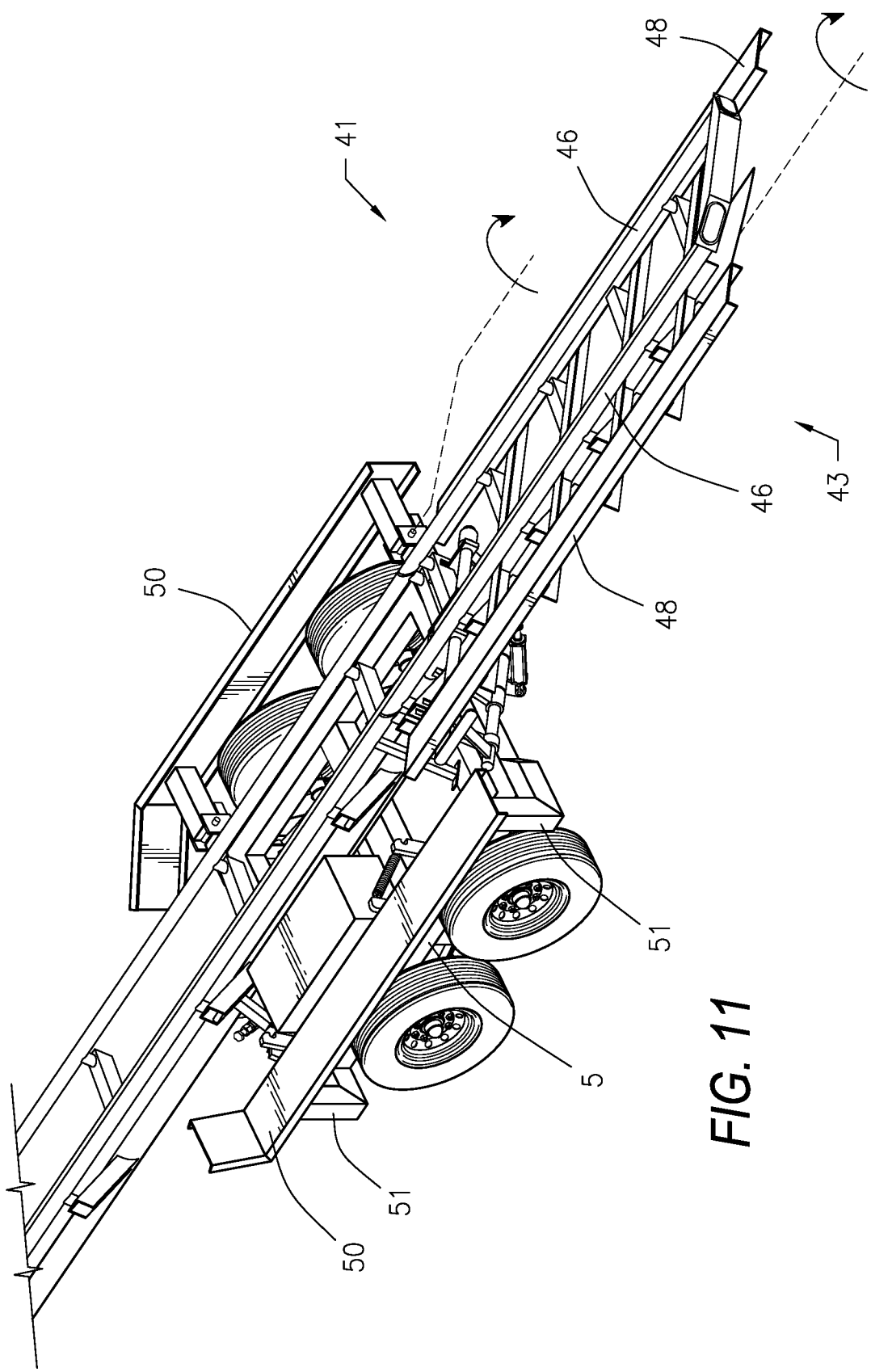
FIG. 11 is a perspective rear view of the ramp system with the frame in a tilted position.

The ramp portion 41 may be located at the back of the bale trailer 1, rearward of the axle caddy 5. The ramp portion 41 may comprise a frame 43, which may have the same components and may be aligned with and attached to the frame 2 along the rest of the bale trailer 1. When the frame 2 pivots, the frame 43 may likewise pivot, as shown in FIG. 11. As with the frame 2, the frame 43 may be capable of holding bales 27 when in the upright position, and dumping those bales 27 when tipped. The ramp portion 41 may be 10 feet long and capable of holding two bales 27, or any other length desired.

Specifically, the frame 43 may comprise a main pipe 44, a plurality of arms 45 extending outward from the main pipe 44 at an upward angle on both sides, and a pair of top rails 46 supported by the arms 45, one top rail 46 located on either side of the main pipe 44 and running parallel thereto. The main pipe 44 may be elongate, but may otherwise have any desired structure, components, and configuration. For example, the main pipe 44 shown in the figures comprises a pipe with a circular cross section topped with two pieces of angle iron. The back end of the main pipe 44 may terminate in an angle 47, as shown in FIG. 7, allowing the main pipe 44 to lie flat on the ground when the ramp portion 42 is in the downward-angled position, as shown in FIG. 8.

Figure 10:
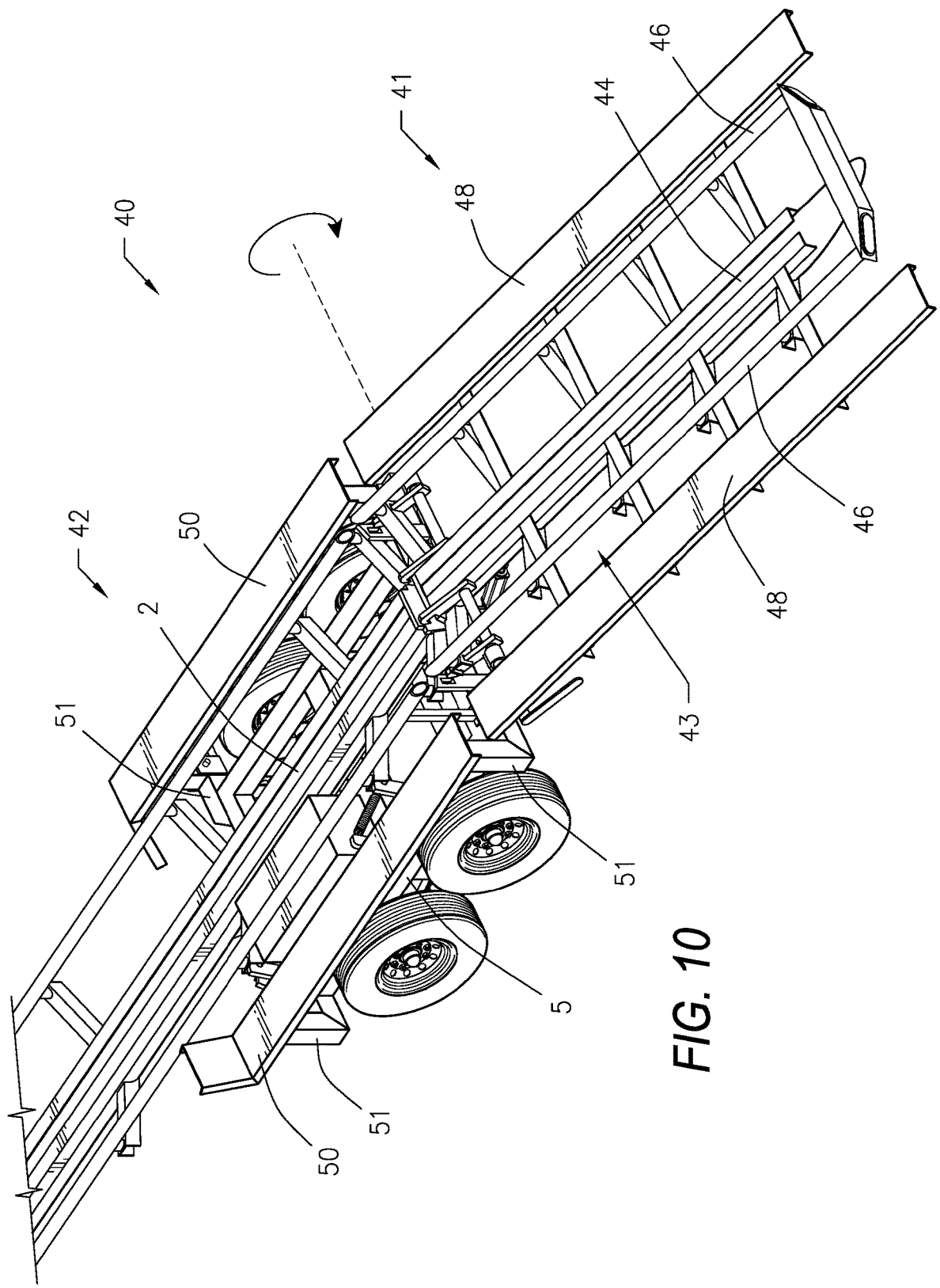
FIG. 10 is a perspective rear view of the ramp system in the downward-angled position.

The ramp portion 41 may further comprise a pair of ramp elements 48 attached to the frame 43 via a plurality of supports 49. The ramp elements 48 may each be elongate, straight, and have a flat top. The ramp elements 48 may each be 5 inches wide, or any other width desired. The ramp elements 48 may be located one on each side of the frame 43. The ramp elements 48 may tip along with the frame 43 when the frame 2 pivots, as shown in FIG. 11. The ramp elements 48 may be located to the outside of and below the top rails 46, such that the ramp elements 48 do not get in the way of dumping bales 27 off of the frame 43 when tipped. When the ramp portion 41 is in the downward-angled position, the ramp elements 48 may extend from the ground to the fender portion 42, as shown in FIGS. 8 and 10, effectively forming a ramp.

The fender portion 42 may be located above the axle caddy 5. The fender portion 42 may comprise the portion of the frame 2 located above the axle caddy 5 and a pair of fenders 50. The fenders 50 may be attached to the axle caddy 5 via a plurality of fender supports 51. Being attached to the axle caddy 5 rather than the frame 2, the fenders 50 may not tip when the frame 2 pivots. The fenders 50 may each be elongate, straight, and have a flat top. The fenders 50 may each be 5 inches wide or any other width desired. The fenders 50 may be located above the wheels of the bale trailer 1 and may be horizontally oriented, with the flat tops lying parallel to the ground. The ramp elements 48 may align with the fenders 50. This may allow a skid loader or similar equipment to be driven up the ramp formed by the ramp elements 48 and onto the fenders 50. The skid loader or similar equipment may remain on the fenders 50 above the axle caddy 5 for transport. The fender 50 on the driver side may have a stop 73 located at the front of the fender 50 to prevent the skid loader or similar equipment from being driven too far forward. The stop 73 may be formed by bending the end of the fender 50 upward. The fender 50 on the passenger side may likewise be bent at the front end, but it may bend downward at a 45-degree angle or any other desired angle. This may prevent a bale 27 located forward of the fender 50 from getting caught on the fender 50 during dumping and becoming damaged.

Figure 18A:
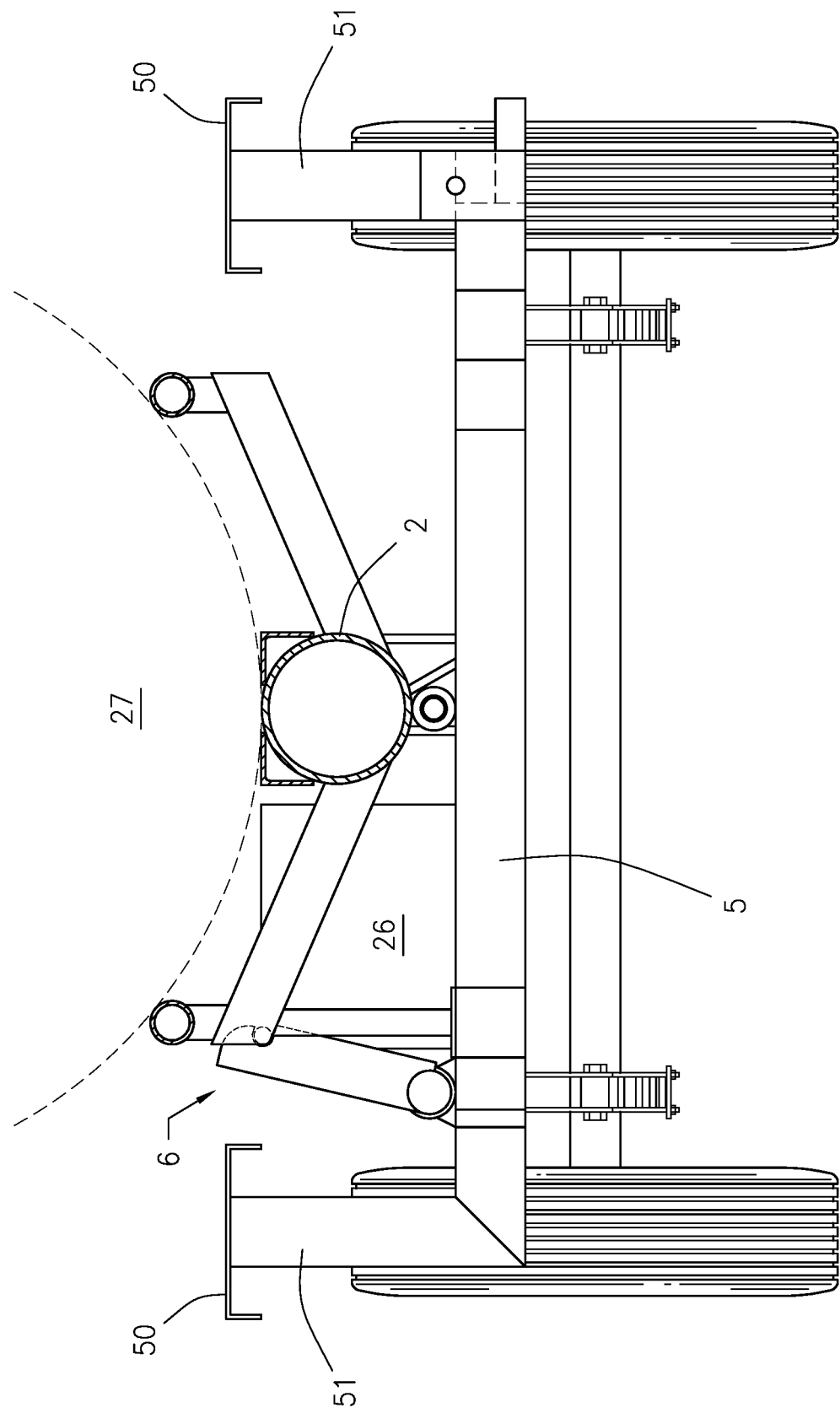
FIG. 18A is a back sectional view of the front portion of the ramp system, with the frame upright and bale in place, showing the passenger-side fender in an upright position.
Figure 18B:
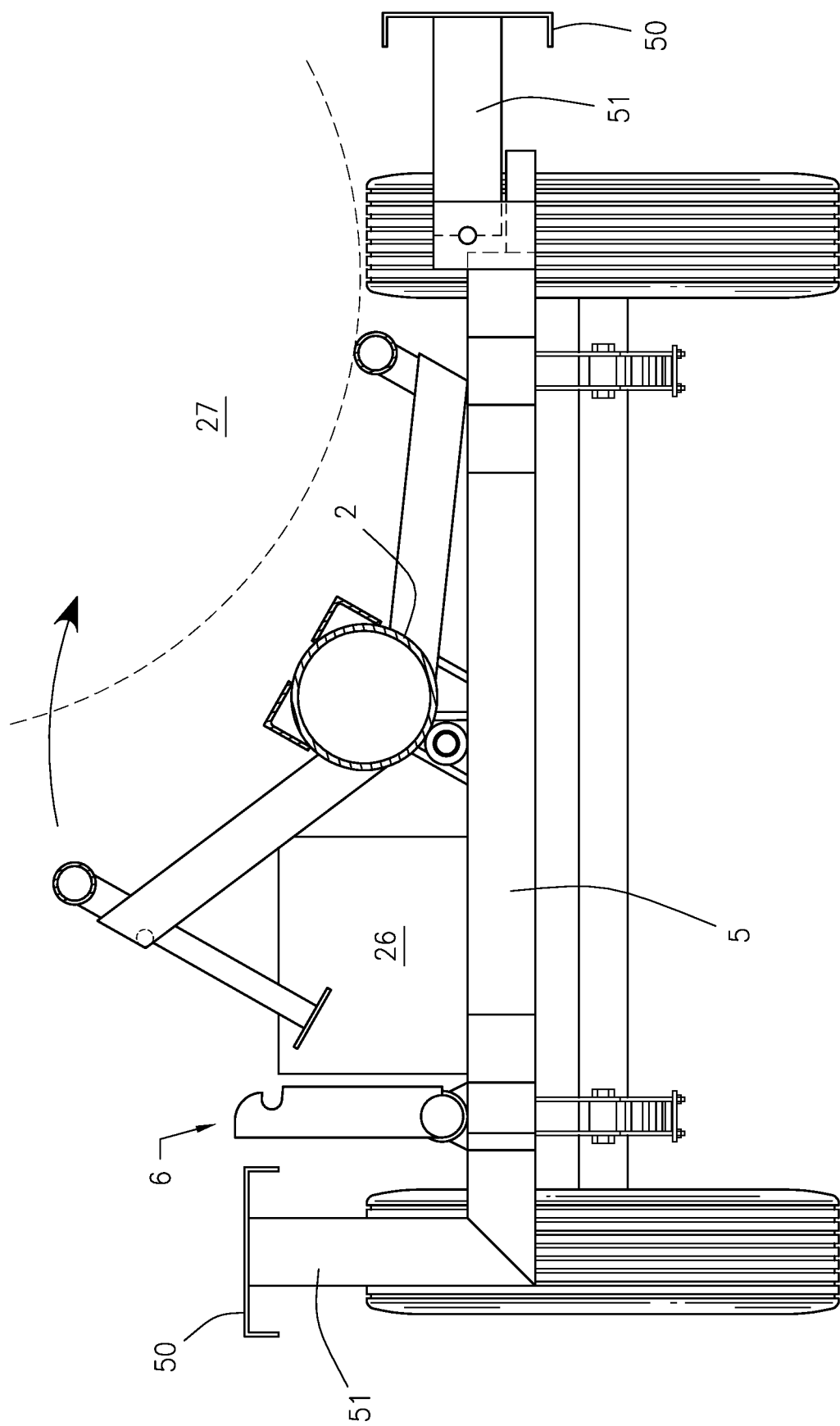
FIG. 18B is a back sectional view of the front portion of the ramp system, with the frame tilted in the process of dumping the bale, showing the passenger-side fender in a folded position.
Figure 19B:
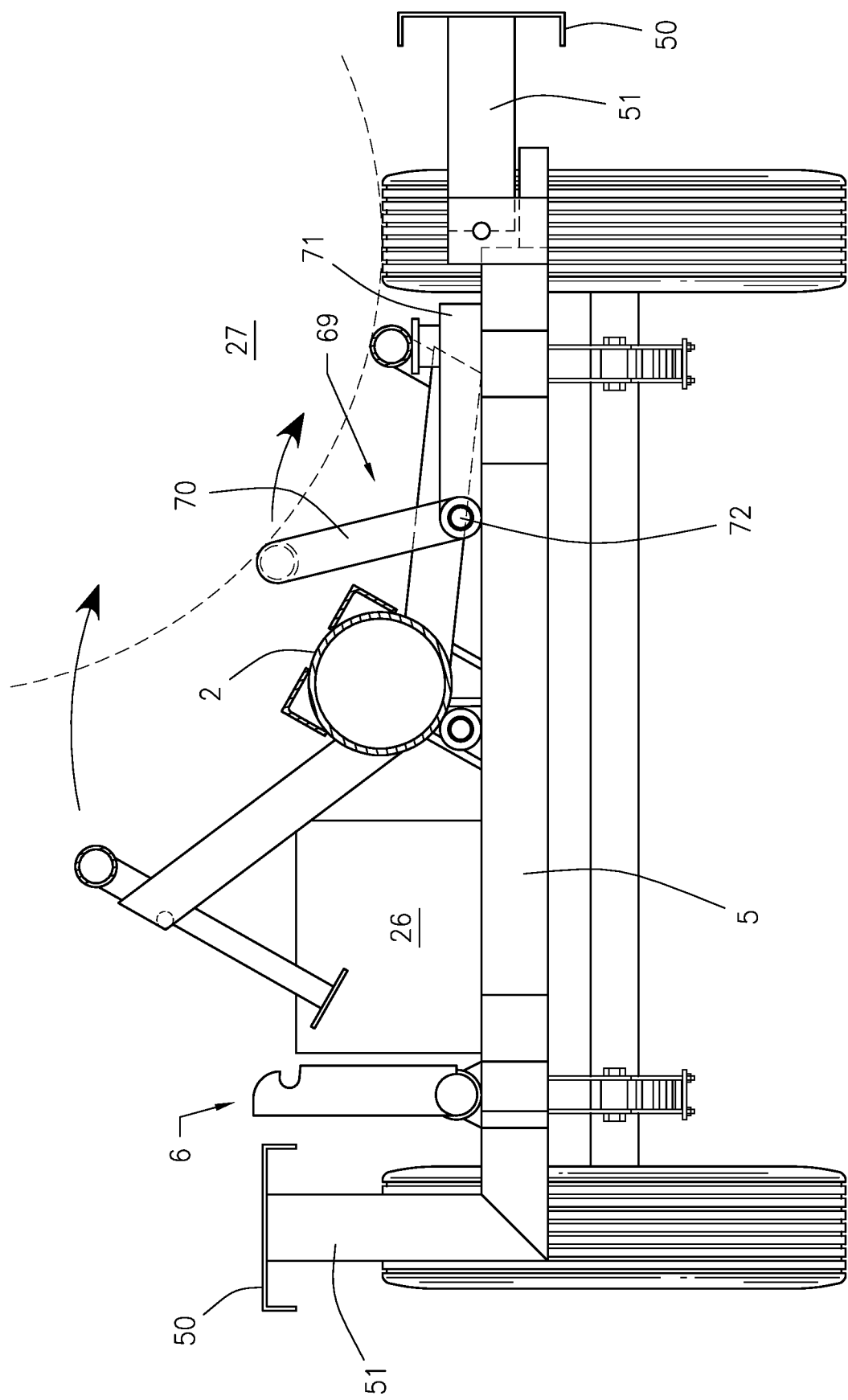
FIG. 19B is a back sectional view of the front portion of the ramp system, with the frame tilted in the process of dumping the bale and the passenger-side fender in the folded position, showing the bale kicker in a second position assisting in kicking out the bale.
Figure 20:
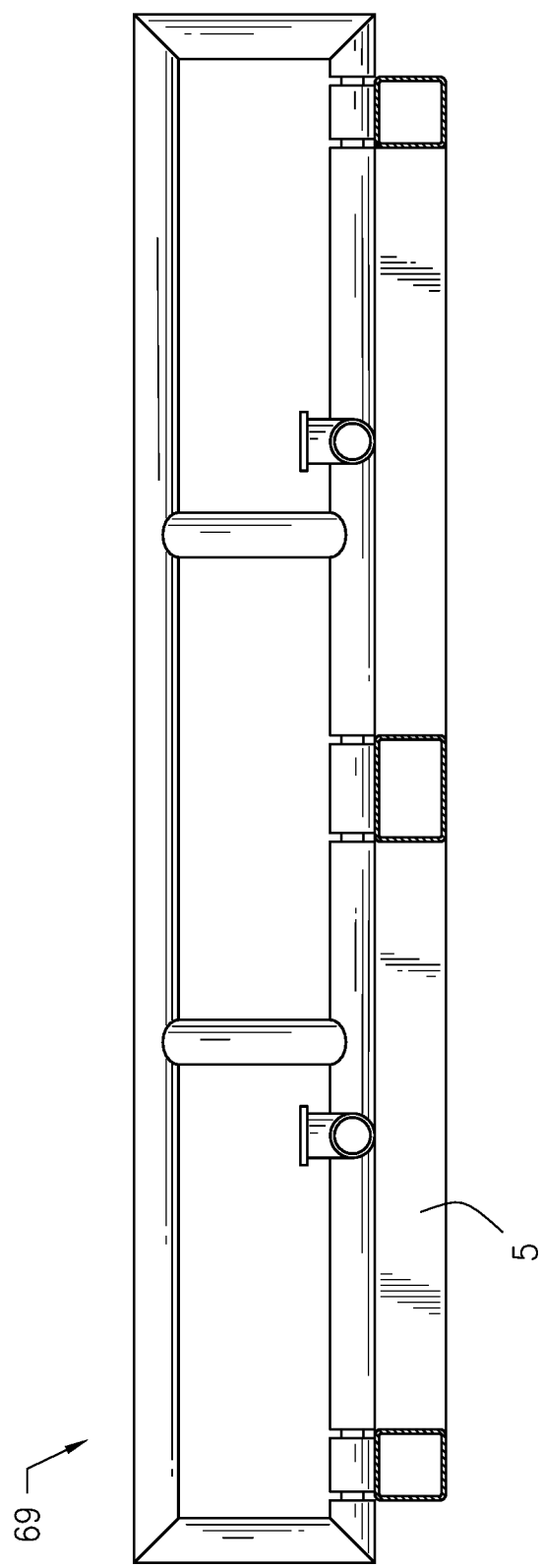
FIG. 20 is a side view of the axle caddy and frame assembly showing the location of the bale kickers.

The fender supports 51 located on the passenger side may be capable of pivoting, allowing the fender 50 on the passenger side to be folded down out of the way during dumping, as shown in FIG. 11. Since the fenders 50 do not tip when the frame 2 pivots, the bale 27 could hit the passenger side fender 50 when the frame 2 is tipped if the passenger side fender 50 is left upright, preventing the bale 27 from dumping. Folding the passenger side fender 50 downward may provide a clear path for the bale 27, as shown in FIG. 18B. Pivoting fender supports 51 may not be necessary on the driver side of the bale trailer 1 if the bale trailer 1 only dumps to the passenger side, as is typical. If, however, the bale trailer 1 is capable of dumping to the driver side, the fender supports 51 on the driver side may likewise be capable of pivoting.

Figure 13:
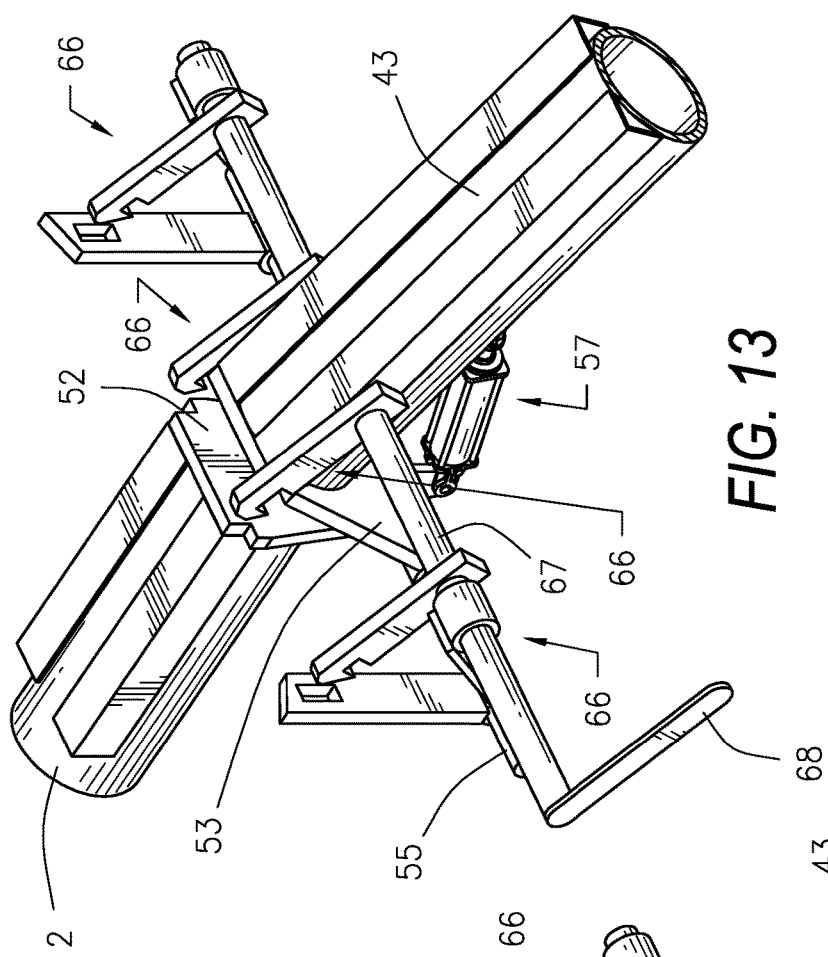
FIG. 13 is a close-up perspective rear view of the frame, lower lock assembly, and lower hydraulic assembly of the ramp system in the downward-angled position.
Figure 12:
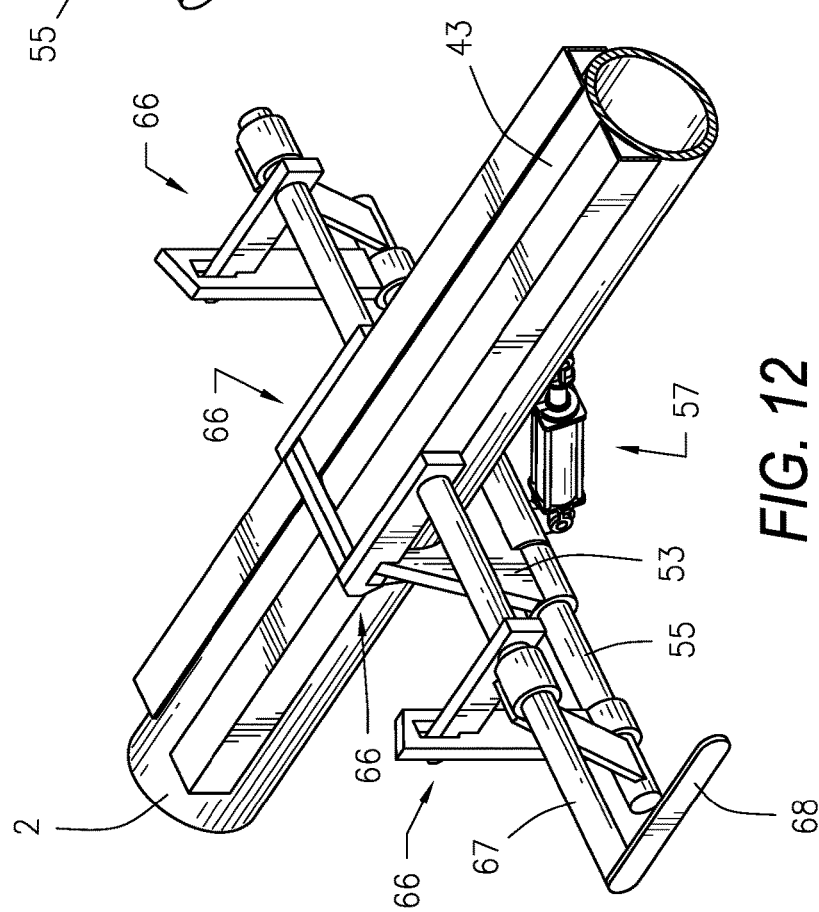
FIG. 12 is a close-up perspective rear view of the frame, lower lock assembly, and lower hydraulic assembly of the ramp system in the horizontal locked position.

The frame 43 of the ramp portion 41 may attach to the frame 2 via a system of hinges 56, optional hydraulic cylinders 57, and lock assemblies 66. As noted above, the frame 43 may align with the frame 2 when the ramp portion 41 is in the horizontal locked position. FIG. 12 shows a close-up view of the back end of frame 2 aligned with the front end of frame 43, while FIG. 13 shows the same view when the ramp portion 41 is in the downward-angled position. A front plate 52 may be attached to the back end of frame 2, as shown in FIG. 17, and a back plate 53 may be attached to the front end of frame 43, as shown in FIG. 16. The front plate 52 may abut the back plate 53 along their respective faces when the ramp portion 41 is in the horizontal locked position, as shown in FIG. 14. The front plate 52 and the back plate 53 may connect via bushings 54 and a pin 55. In particular, the front plate 52 may have a single central bushing 54, while the back plate 53 may have two bushings 54 that are spaced apart such that they straddle the central bushing 54 of the front plate 52 when the front plate 52 and the back plate 53 abut. One or more of the bushings 54 may be offset from their respective plates 52 or 53 such that all bushings 54 align when the front plate 52 and the back plate 53 abut. The pin 55 may extend through all of the bushings 54, forming a hinge 56. The plates 52 and 53 may be oriented such that the hinge 56 is located below the frames 2 and 43, allowing the ramp portion 41 to angle downward as desired.

The ramp portion 41 may be raised and lowered manually, if desired. Alternately, one or more hydraulic cylinders 57 may be attached to the ramp portion 41 and the fender portion 42, providing easy raising and lowering of the ramp portion 41. If the ramp system 40 is used in conjunction with the hydraulic system described above for tipping the frame 2, the hydraulic cylinders 57 may use the same hydraulic pump 26. Alternately, if the bale trailer 1 is a manual dump bale trailer, the hydraulic cylinders 57 may have their own hydraulic pump 26.

Each hydraulic cylinder 57 may comprise a hydraulic mount 58, a piston rod 59, a housing 60, and the hydraulic pump 26. A single common hydraulic pump 26 may be utilized for all hydraulic cylinders 57 and 22, if present. A diverter or splitter may be used to allow only hydraulic cylinders 57 or hydraulic cylinder 22 to be used at one time. The hydraulic pump 26 may be mounted elsewhere on the axle caddy 5, but may be in fluid communication with the housing 60 of each hydraulic cylinder 57 such that the piston rod 59 may reciprocate therein. The hydraulic pump 26 may be run to the truck or other vehicle 4. The hydraulic cylinders 57 alternately may be electronic actuators.

One hydraulic cylinder 57 may be mounted below the frames 2 and 43, with one end attached to frame 2 and the other end attached to frame 43. Specifically, as shown in FIGS. 14 and 15, the hydraulic mount 58 may straddle a flange 61 attached to the underside of the main pipe 44 of the frame 43, with a pin 62 passing therethrough to pivotally attach the hydraulic mount 58 to the flange 61. The housing 60 may be mounted to the frame 2 via a cylinder mount 63 straddling a flange 64 attached to the underside of the frame 2, with a cylinder pin 65 passing therethrough to pivotally attach the cylinder mount 63 to the flange 64. The piston rod 59 may be attached at one end to the hydraulic mount 58 with its other end housed within the housing 60. As such, extending the hydraulic cylinder 57 may raise the ramp portion 41 to the horizontal position, while retracting the hydraulic cylinder 57 may lower the ramp portion 41. Two additional hydraulic cylinders 57 may optionally be mounted near the tops of frames 2 and 43, one on either side, just below the top rails 46.

The ramp portion 41 may be maintained in the horizontal position via one or more lock assemblies 66. For example, as shown in FIGS. 12 and 13, four lock assemblies 66 may be used: one on either side of the main pipe 44 securing plates 52 and 53 to each other and one located directly below each top rail 46 securing an arm 45 on frame 43 to an arm on frame 2. All four lock assemblies 66 may share a single pin 67 and may be actuated by a single handle 68.

The bale trailer 1 may have a bale kicker 69 to assist in removing bales 27 from the bale trailer 1. The bale kicker 69 may be located over the axle caddy 5 and may run the length of the axle caddy 5. The bale kicker 69 may be used in conjunction with the hydraulic system described above or may be used with a manual dump bale trailer, a rigid mount hydraulic bale trailer, or any other bale trailer, as desired. The bale kicker 69 may be used on a bale trailer 1 either with or without the ramp system 40 described above.

The bale kicker 69 may have an L-shaped cross section, with arms 70 and 71 extending outward from a pivot point 72. The arms 70 and 71 may extend outward at a right angle to each other, or at any other desired angle. The bale kicker 69 may be pivotally mounted at the pivot point 72 to the axle caddy 5 to the side of the frame 2 on the passenger side. In a first position, arm 70 may extend upward toward the frame 2, such that the distal end of the arm 70 is located under the bale 27 when the frame 2 is upright and in use. As a result, arm 71 may extend upward away from the frame 2, toward the passenger side of the bale trailer 1. When the frame 2 is tilted to dump the bale 27, the top rail of the frame 2 may hit the distal end of arm 71, forcing it downward. This may cause arm 70 to rise. If bale 27 were to get caught on a wheel, the distal end of the rising arm 70 may hit the bale 27, giving it a kick and dislodging it from the wheel, allowing it to continue to the ground.

Whereas, the devices and methods have been described in relation to the drawings and claims, it should be understood that other and further modifications, apart from those shown or suggested herein, may be made within the spirit and scope of this invention.

What is claimed is:

1. A bale trailer comprising:
   a ramp system capable of loading and hauling a skid loader;
   a frame, where the frame is elongate and has a long axis; and
   an axle caddy, where the frame is connected to the axle caddy such that the frame is capable of tilting on its long axis;
   the ramp system comprising:
   a ramp portion located rearward of the axle caddy, where the ramp portion comprises a ramp frame, having a long axis, aligned with and pivotally attached to the frame such that:
      the frame and the ramp frame align along their long axes when the ramp frame is in an upright position;
      the ramp frame is capable of tilting on its long axis when the frame tilts on its long axis when the ramp frame is in the upright position; and
      the ramp frame is capable of pivoting to a downward-angled position such that the ramp frame forms a ramp from a surface upon which the bale trailer rests to the frame; and
   a fender portion located above the axle caddy.

2. The bale trailer of claim 1, where:
   the ramp portion further comprises a pair of ramp elements attached to the ramp frame where each of the ramp elements is elongate and straight and has a flat top; and
   the fender portion comprises a pair of fenders attached to the axle caddy where each of the fenders is elongate and straight and has a flat top and where the fenders align with the ramp elements such that a skid loader may be driven up the ramp elements when the ramp frame is in the downward-angled position and onto the fenders.

3. The bale trailer of claim 2, where:
   the ramp elements are attached to the ramp frame via a plurality of supports; and
   the ramp elements tilt along with the ramp frame when the ramp frame tilts.

4. The bale trailer of claim 2, where:
   the fenders are attached to the axle caddy via a plurality of supports; and
   the fenders do not tilt when the frame tilts.

5. The bale trailer of claim 2, where the fender portion further comprises a stop located at the front of at least one of the fenders.

6. The bale trailer of claim 2 where at least one fender in the pair of fenders is pivotally attached to the axle caddy such that the fender is capable of being folded down during dumping of the bale trailer.

7. The bale trailer of claim 1 where the ramp frame comprises:
- a main pipe with two opposing longitudinal sides;
- a plurality of arms extending outward from the main pipe at an upward angle on both sides; and
- a pair of top rails supported by the arms comprising one top rail located on either side of the main pipe and running parallel thereto.

8. The bale trailer of claim 7 where the main pipe has a back end that terminates in an angle such that the main pipe lays flat to the surface when the ramp frame is in the downward-angle position.

9. The bale trailer of claim 7 where the ramp portion further comprises a pair of ramp elements attached to the ramp frame where:
- each of the ramp elements is elongate and straight and has a flat top;
- the ramp elements are located one on each side of the main pipe; and
- the ramp elements are located to the outside of and below the top rails.

10. The bale trailer of claim 1 further comprising a hydraulic system such that the ramp portion is capable of pivoting between the downward-angled position and the upright position via the hydraulic system.

11. The bale trailer of claim 10 where the hydraulic system is additionally capable of tilting the frame.

12. The bale trailer of claim 1 further comprising at least one lock assembly capable of maintaining the ramp portion in the upright position.

\* \* \* \* \*